[19] United States Patent
Downer et al.

(10) Patent No.: US 7,051,180 B2
(45) Date of Patent: May 23, 2006

(54) MASTERLESS BUILDING BLOCK BINDING TO PARTITIONS USING IDENTIFIERS AND INDICATORS

(75) Inventors: Wayne A. Downer, Portland, OR (US); Bruce M. Gilbert, Beaverton, OR (US); Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/045,796

(22) Filed: Jan. 9, 2002

(65) Prior Publication Data

US 2003/0131214 A1 Jul. 10, 2003

(51) Int. Cl.
*G06F 12/00* (2006.01)

(52) U.S. Cl. .................. 711/173; 709/215; 711/156

(58) Field of Classification Search ............. 709/214, 709/215, 201; 707/8; 711/173, 170, 154, 711/147, 156
See application file for complete search history.

(56) References Cited

U.S. PATENT DOCUMENTS

| | | | |
|---|---|---|---|
| 3,641,505 A | | 2/1972 | Artz et al. |
| 5,887,138 A | | 3/1999 | Hagersten et al. |
| 5,893,144 A | | 4/1999 | Wood et al. |
| 5,905,998 A | | 5/1999 | Ebrahim et al. |
| 5,926,829 A | | 7/1999 | Hagersten et al. |
| 6,035,378 A | * | 3/2000 | James ........................ 711/147 |
| 6,049,853 A | | 4/2000 | Kingsbury et al. |
| 6,075,938 A | | 6/2000 | Bugnion et al. |
| 6,088,770 A | | 7/2000 | Tarui et al. |
| 6,345,317 B1 | * | 2/2002 | Takeda ........................ 710/2 |
| 6,564,252 B1 | * | 5/2003 | Hickman et al. ........... 709/214 |
| 6,647,508 B1 | * | 11/2003 | Zalewski et al. ........... 711/173 |
| 6,728,709 B1 | * | 4/2004 | Plasek et al. ................ 711/152 |

OTHER PUBLICATIONS

Nanda et al., "Mapping Applications onto a Cache Coherent Multiprocessor," Proceedings on Supercomputing '92, pp. 368-377 (1992).*
US 6,021,479, 02/2000, Stevens (withdrawn)

* cited by examiner

*Primary Examiner*—Pierre-Michel Bataille
(74) *Attorney, Agent, or Firm*—Abdy Raissinia

(57) ABSTRACT

A masterless approach binds multiprocessor building blocks to partitions of a computer system using identifiers and indicators. A number of building blocks communicate among each other to determine a partition to which each building block is to be partitioned. For each unique partition to which one or more of the building blocks is to be partitioned, the building blocks communicate among each other to determine building block uniqueness, and then each of the building blocks joins the partition. The building blocks share with one another their logical port identifiers, which uniquely identify the building block within a partition. A commit indicator of each building block indicates that the building block has committed itself to the partition and that its identifiers cannot be changed. A partition protect indicator is set by one building block of a partition, preventing changes to the commit indicators of other building blocks wishing to join the partition except by that one building block, effectively protecting the partition. Building block protect indicators protect the building blocks themselves.

27 Claims, 20 Drawing Sheets

Port 0 Partition
Configuration Register ← 89

| Bit | Field | |
|---|---|---|
| 31 | Reserved | |
| 30 | | |
| 29 | | |
| 28 | | |
| 27 | | |
| 26 | | |
| 25 | | |
| 24 | | |
| 23 | | |
| 22 | | |
| 21 | | |
| 20 | | |
| 19 | | |
| 18 | | |
| 17 | | |
| 16 | | |
| 15 | | |
| 14 | | |
| 13 | | |
| 12 | | |
| 11 | | |
| 10 | | |
| 9 | | |
| 8 | POEnable | —91 |
| 7 | | |
| 6 | POPartWrProt | —77 |
| 5 | POPortWrProt | —78 |
| 4 | POCommit | —79 |
| 3 | POLogID | —92 |
| 2 | | |
| 1 | POParNum | —93 |
| 0 | | |

FIG. 14

MASTERLESS BUILDING BLOCK BINDING TO PARTITIONS USING IDENTIFIERS AND INDICATORS

CROSS-REFERENCE TO RELATED APPLICATIONS

The following patent applications, all assigned to the assignee of this application, describe related aspects of the arrangement and operation of multiprocessor computer systems according to this invention or its preferred embodiment.

U.S. patent application Ser. No. 10/045,795 by T. B. Berg et al. (BEA919990003US1) entitled "Method And Apparatus For Increasing Requestor Throughput By Using Data Available Withholding" was filed on Jan. 9, 2002.

U.S. patent application Ser. No. 10/045,927 by T. B. Berg et al. (BEA920000017US1) entitled "Method And Apparatus For Using Global Snooping To Provide Cache Coherence To Distributed Computer Nodes In A Single Coherent System" was filed on Jan. 9, 2002.

U.S. patent application Ser. No. 10/045,821 by T. B. Berg et al. (BEA920000018US1) entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,564 by S. G. Lloyd et al. (BEA920000019US1) entitled "Transaction Redirection Mechanism For Handling Late Specification Changes And Design Errors" was filed on Jan. 9, 2002.

U.S. patent application Ser. No. 10/045,797 T. B. Berg et al. (BEA920000020US1) entitled "Method And Apparatus For Multi-path Data Storage And Retrieval" was filed on Jan. 9, 2002.

U.S. patent application Ser. No. 10/045,923, by W. A. Downer et al. (BEA920000021US1) entitled "Hardware Support For Partitioning A Multiprocessor System To Allow Distinct Operating Systems" was filed on Jan. 9, 2002.

U.S. patent application Ser. No. 10/045,925, by T. B. Berg et al. (BEA920000022US1) entitled "Distributed Allocation Of System Hardware Resources For Multiprocessor Systems" was filed on Jan. 9, 2002.

U.S. patent application Ser. No. 10/045,926, by W. A. Downer et al. (BEA920010030US1) entitled "Masterless Building Block Binding To Partitions" was filed on Jan. 9, 2002.

U.S. patent application Ser. No. 10/045,774, by W. A. Downer et al. (BEA920010031US1) entitled "Building Block Removal From Partitions" was filed on Jan. 9, 2002.

BACKGROUND OF THE INVENTION

1. Technical Field

This invention relates generally to multi-processor computer systems, and more particularly to such systems in which there are a number of building blocks divided into a number of partitions.

2. Description Of The Prior Art

There are many different types of multi-processor computer systems. A symmetric multi-processor (SMP) system includes a number of processors that share a common memory. SMP systems provide scalability. As needs dictate, additional processors can be added. SMP systems usually range from two to 32 or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously, For example, in scientific environments, certain simulations and mathematical problems can be split apart and each part processed at the same time.

A non-uniform memory access (NUMA) system is a multi-processing system in which memory is separated into distinct groups. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems.

A particular type of NUMA system is the cache coherent NUMA (CC-NUMA) system. In a CC-NUMA system, the system hardware handles cache coherency between the system building blocks, as well as within them. That is, hardware cache coherency means that there is no software requirement for keeping multiple copies of data up to date, or for transferring data between multiple instances of the operating system or an application. Thus, distributed memory is tied together to form a single memory, and there is no copying of pages or data between memory locations. There is also no software message passing, but rather a single memory map having pieces physically tied together with sophisticated hardware.

The term building block is used herein in a general manner, and encompasses a separable grouping of processor (s), other hardware, such as memory, and software that can communicate with other building blocks. Building blocks, sometimes referred to as nodes, can themselves be grouped together into partitions. A single partition runs a single instance of an operating system. A partition can include one or more building blocks. A system, or a platform, is the whole of all the partitions of all the building blocks. Thus, the building blocks of a platform may be partitioned into a number of partitions of the platform, and so on. Furthermore, two or more partitions can be grouped together as a cluster, where each partition runs its own operating system instance, but has access to shared storage with the other partitions. A cluster is therefore different than a partition, and a partition is different than a building block.

Another particular type of NUMA system is the NUMA-quad (NUMA-Q) system. A NUMA-Q system is a NUMA system in which the fundamental building block is the quad, or the quad building block (QBB). Each quad can contain up to four processors, a set of memory arrays, and an input/output (I/O) processor (IOP) that, through two host bus adapters (HBAs), accommodates two to eight I/O buses. An internal switch in each QBB allows all processors equal access to both local memory and the I/O buses connected to the local I/O processor. An application running on a processor in one QBB can thus access the local memory of its own QBB, as well as the shared memory of the other QBBs. More generally, a quad refers to a building block having at least a collection of up to four processors and an amount of memory.

A difficulty with nearly any type of multi-processor computer system is the manner by which building blocks are bound together into partitions at startup. One approach involves selecting a master building block, which oversees the booting up of the other building blocks, as well as the partitioning of the building blocks into the desired partitions. However, this approach is not particularly fault-tolerant, in that should the master building block fail, the entire platform can potentially also fail, since there is no master overseeing the partitioning process. Redundant master building blocks, independent agents, or other ways to add fault tolerance to the system have been suggested, but can be overly complex and difficult to implement.

Another approach to binding building blocks into desired partitions at startup can be referred to as the masterless approach, in that no single building block is a priori designated as the master to oversee the binding process. Traditionally, however, the masterless approach has been plagued by race conditions and other difficulties. For example, two building blocks may decide to become the temporary master at the same time. However, having a preordained ordering of which building blocks are to temporarily retain master status is also problematic, because two otherwise identical building blocks may complete their startup processes in different lengths of time and/or at different times. Ensuring the orderly binding of building blocks into partitions is thus difficult to guarantee.

For these described reasons, as well as other reasons, therefore, there is a need for the present invention.

SUMMARY OF THE INVENTION

The invention relates to a masterless approach for binding building blocks into partitions using identifiers and indicators. In a method of the invention, a number of building blocks communicate among each other to determine a partition to which each building block is to be partitioned. For each unique partition to which one or more of the building blocks is to be partitioned, such building blocks communicate among each other to determine building block uniqueness, and then each of the building blocks joins the partition.

A system of the invention includes a commit indicator and a partition indicator for each of a number of building blocks to be partitioned into a number of partitions in a masterless manner. The commit indicator of a building block being set signifies that a logical identifier and a partition identifier of the building block cannot be changed. The partition protect indicator of the building block being set, in addition to the commit indicator of the building block being set, signifies that only building blocks in the partition may change the commit indicator of the building block.

An article of manufacture of the invention includes a computer-readable medium and means in the medium. The means in the medium is for joining a partition in a masterless manner by a building block of a number of building blocks. This is accomplished by communicating with other of the building blocks and by examining a number of indicators of each building block, including a partition protect indicator, a building block protect indicator, and a building block-to-partition commit indicator.

Other features and advantages of the invention will become apparent from the following detailed description of the presently preferred embodiment of the invention, taken in conjunction with the accompanying drawings.

BRIEF DESCRIPTION OF THE DRAWINGS

FIG. 14 is a diagram illustrating the contents of a partition configuration register for system port 0 used in accordance with an embodiment of the present invention.

DESCRIPTION OF THE PREFERRED EMBODIMENT

Overview

Figure 1:
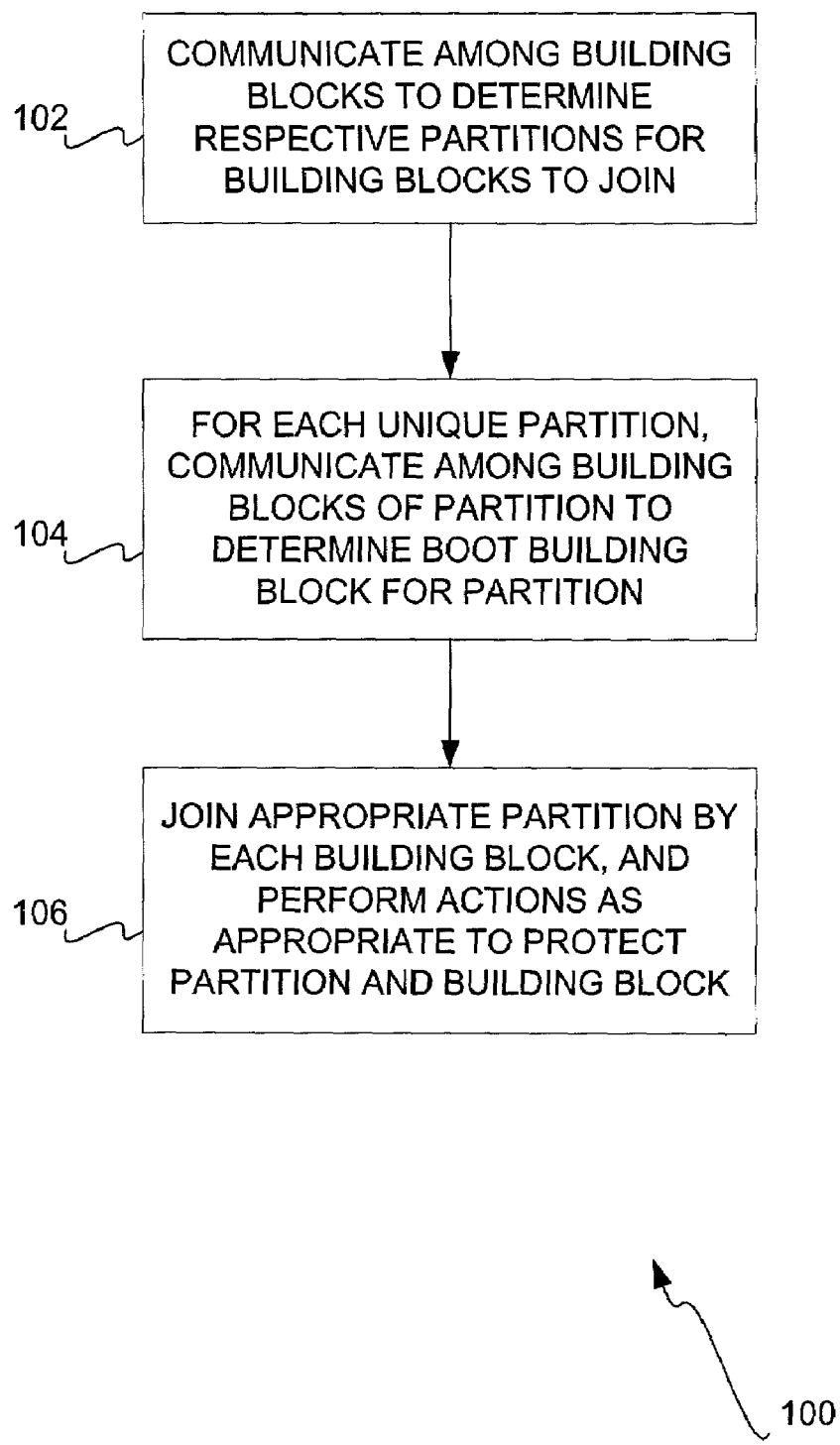
FIG. 1 is a flowchart of a method for masterless binding of building blocks to partitions according to a preferred embodiment of the invention, and is suggested for printing on the first page of the patent.

FIG. 1 shows a method 100 for masterless binding of building blocks to partitions, according to a preferred embodiment of the invention. The method 100, as well as other methods of the invention, can be implemented as a means in a computer-readable medium stored on an article of manufacture. The medium may be a recordable data storage medium, a modulated carrier signal, or another type of medium. Other components described in the detailed description can also be implemented as such means.

First, a number of building blocks communicate with one another to determine the desired partition each building block wishes to join (102). This may be accomplished by the building blocks sharing with one another their physical port identifiers and their partition identifiers. The physical port identifier of a building block uniquely identifies the building block within a platform, whereas the partition identifier of a building block identifies the partition that the building block wishes to join. Once the communication of 102 has occurred, each building block knows the identities of the other building blocks, as well as the partitions that they wish to join.

Next, for each unique partition, the building blocks that wish to join this partition communicate with one another to ensure building block uniqueness (104). That is, from 102 to 104, the building blocks are effectively divided into a number of groups by the partitions to which they wish to join. The building blocks within each such group communicate with one another to determine, or verify, building block uniqueness. For instance, this may be accomplished by the building blocks sharing with one another their logical port identifiers. The logical port identifier of a building block should uniquely identify the building block within a partition. Within a partition, each building block of the partition should have a unique logical port identifier. Once the communication of 104 has occurred, each building block in a given group knows the identifiers of the other building blocks in the group by their logical port identifiers.

Next, the building blocks join their partitions, where actions may be undertaken by the building blocks of a partition to ensure protection of the partition, as well as protection of the building blocks of the partition (106). A commit indicator of each building block may be set to indicate that the building block has committed itself to the partition. Once the building block has committed itself in this manner, its identifiers cannot be changed and the building block is a committed member of the partition specified by its partition identifier.

Next, a partition protect indicator is set. The first building block of a partition to protect the partition in this manner effectively protects the partition. Only this first building block of a partition can then change the commit indicators of other building blocks wishing to join the partition. More generally, only the building blocks that have committed to a protected partition can change the commit indicator of other building blocks wishing to join the partition. The building blocks themselves are protected by setting building block protect indicators.

As has been described, a number of indicators can be used within the method 100 by the building blocks. Each building block may have a partition protect indicator, a commit indicator, and a building block protect indicator. When the commit indicator of a building block is set, this signifies that the building block has joined a partition, and the logical port identifier and the partition identifier of the building block cannot be changed. When the partition protect indicator of a building block is set, in addition to the commit indicator of the building block being set, this signifies that the partition that the building block has joined is protected. Only the building blocks in this partition can change the commit indicator of the building block.

When the building block protect indicator of a building block is set, this signifies that the logical port identifier, the partition identifier, and the physical port identifier of the building block can only be changed by the building block itself. However, if the commit indicator is further set, then not even the building block itself can change its logical port identifier and its partition identifier. Each of the indicators may be a hardware bit that is set by being turned on to a value of one, and is reset by being turned off to a value of zero.

The indicators of the building blocks can thus themselves be considered a system by which the building blocks are partitioned into partitions in a masterless manner. That is, as is explained in more detail in subsequent sections of the detailed description, the indicators are used by the building blocks to partition themselves into partitions. The indicators are lockable—that is, they can be set—such that their status as being locked or unlocked is indicative of the completion status of the masterless partitioning process. When all the indicators are locked, or set, this means that the building blocks have completed the process of partitioning themselves into partitions in a masterless manner. Initially, the indicators are unlocked, or not set, and as the partitioning process is completed, more of the indicators are locked.

Therefore, when a building block is to join a partition, its partition identifier must identify this partition, and its logical port identifier must be unique as to the other building blocks that have already joined the partition. The commit indicator of the building block is then set, as well as its partition protect indicator and its building block protect indicator. When a building block is to be removed from a partition, first any of its resources that are used within the partition must be removed from the partition, so that there are no dependencies on the building block. Thereafter, the commit indicator of the building block is reset, or turned off.

Technical Background

Figure 2:
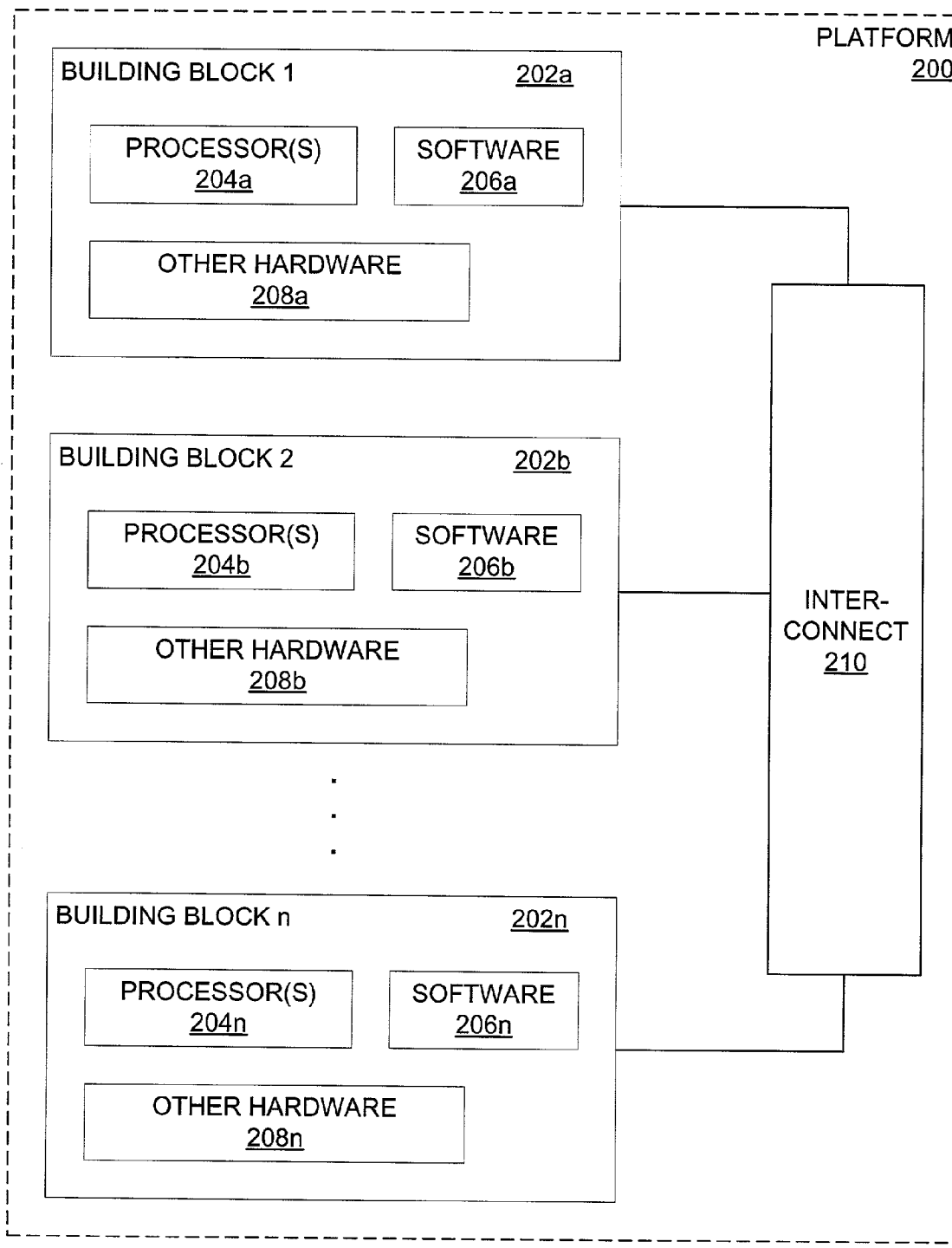
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202*a*, 202*b*, . . . 202*n*, that are connected to one another via an interconnect 210. Each example building block has one or more processors, software, as well as other hardware, such as memory. For instance, the building block 202*a* has processor(s) 204*a*, software 206*a*, and other hardware 208*a*, whereas the building block 202*b* has processor(s) 204*b*, software 206*b*, and other hardware 208*b*. The building block 202*n* has processor(s) 204*n*, software 206*n*, and other hardware 208*n*. A building block can be non-restrictively defined as a grouping of at least one or more processors and memory, although the invention is not so limited.

The platform 200 itself can be a non-uniform memory access (NUMA) system, such as a cache-coherent (CC-NUMA) system, a NUMA-quad (NUMA-Q) system, and so on. Where the platform 200 is a NUMA-Q system, each example building block is a quad, or quad building block (QBB), having up to four processors, local memory, and input/output (I/O) hardware. The interconnect 210 may be a link, such as an IQ-link or a CC-link. The invention can also be implemented in conjunction with other systems, such as symmetric multi-processor (SMP) systems, and so on. The term platform as used herein is synonymous with the term system.

Figure 3:
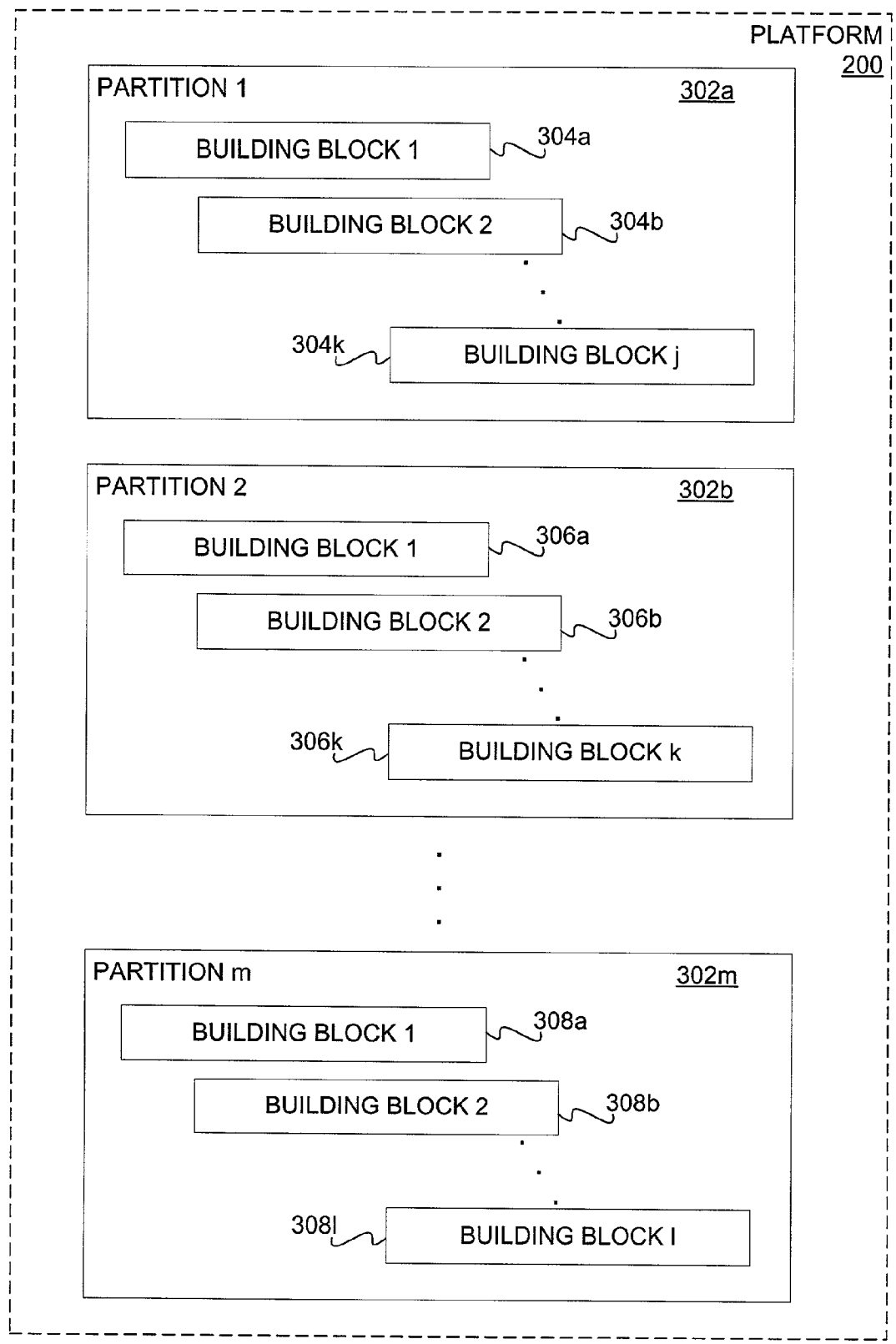
FIG. 3 is a diagram of the example platform of FIG. 2 showing the example building blocks having been partitioned into a number of example partitions, according to an embodiment of the invention.

FIG. 3 shows the platform 200 of FIG. 2 after the building blocks have been bound to different partitions 302*a*, 302*b*, . . . , 302*m* in accordance with an embodiment of the invention. The partition 302*a* has building blocks 304*a*, 304b, ..., 304j bound thereto, whereas the partition 302b has bound thereto building blocks 306a, 306b, ..., 306k. The partition 302m has bound thereto building blocks 308a, 308b, ..., 308l. The building blocks 202a, 202b, ..., 202n of FIG. 2 are inclusive of the building blocks 304a, 304b, ..., 304j, 306a, 306b, ..., 306k, and 308a, 308b, ..., 308l. Each partition 302a, 302b, ..., 302m can be non-restrictively defined as a group of one or more building blocks running a single operating system instance, although the invention is not so limited.

Figure 4:
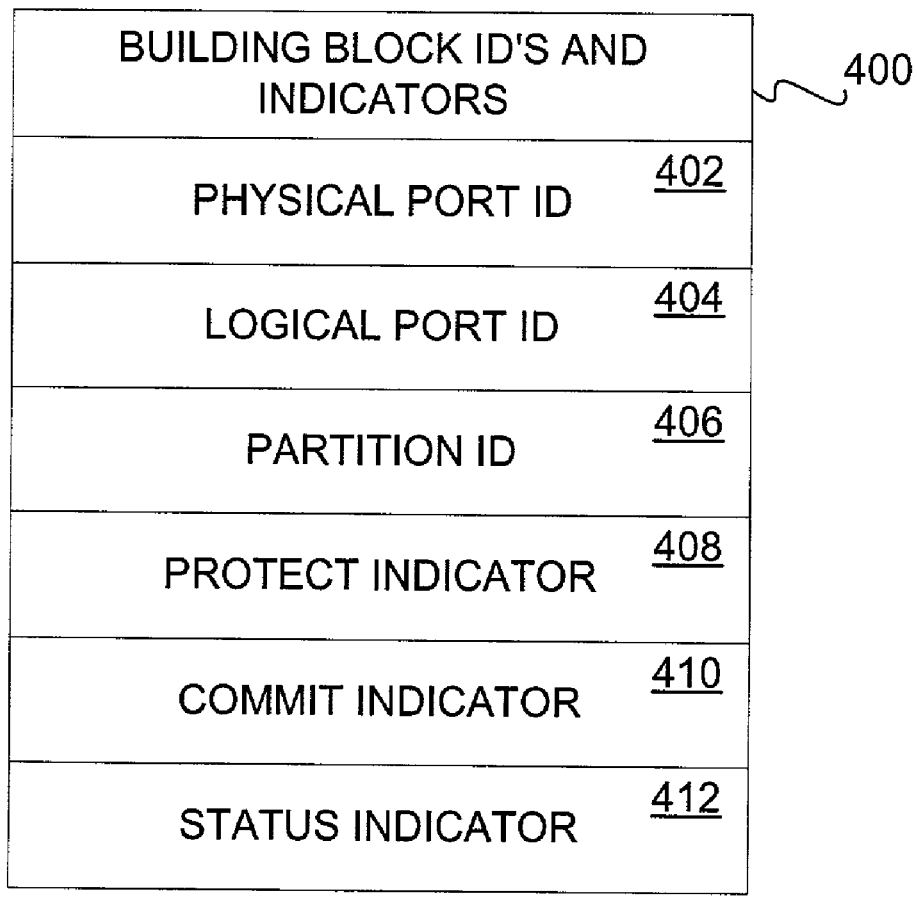
FIG. 4 is a diagram of building block identifiers and indicators used in conjunction with an embodiment of the invention.

FIG. 4 shows the identifiers and indicators 400 used by building blocks for masterless binding to partitions, according to an embodiment of the invention. Each building block has a set of the identifiers and indicators 400. The physical port identifier 402 identifies the physical location of the building block within a platform, whereas the logical port identifier 404 identifies the logical location of the building block within its partition. The physical port identifier 402 is typically a preset permanent identifier of the building block, whereas the logical port identifier 404 can be configured by a user, or automatically generated based on the physical port identifiers of the building blocks in the same partition that have been received.

The partition identifier 406 indicates the partition of the platform to which the building block is to be bound, and is typically set by the user. The protect indicator 408 indicates whether the building block has been write protected, whereas the commit indicator 410 indicates whether the building block has been bound, or committed, to its partition. The status indicator 412 indicates the status of the building block, such as whether it is booting up, whether it has been reset, and so on.

Software Implementation: Binding Building Blocks to Partitions

Figure 5A:
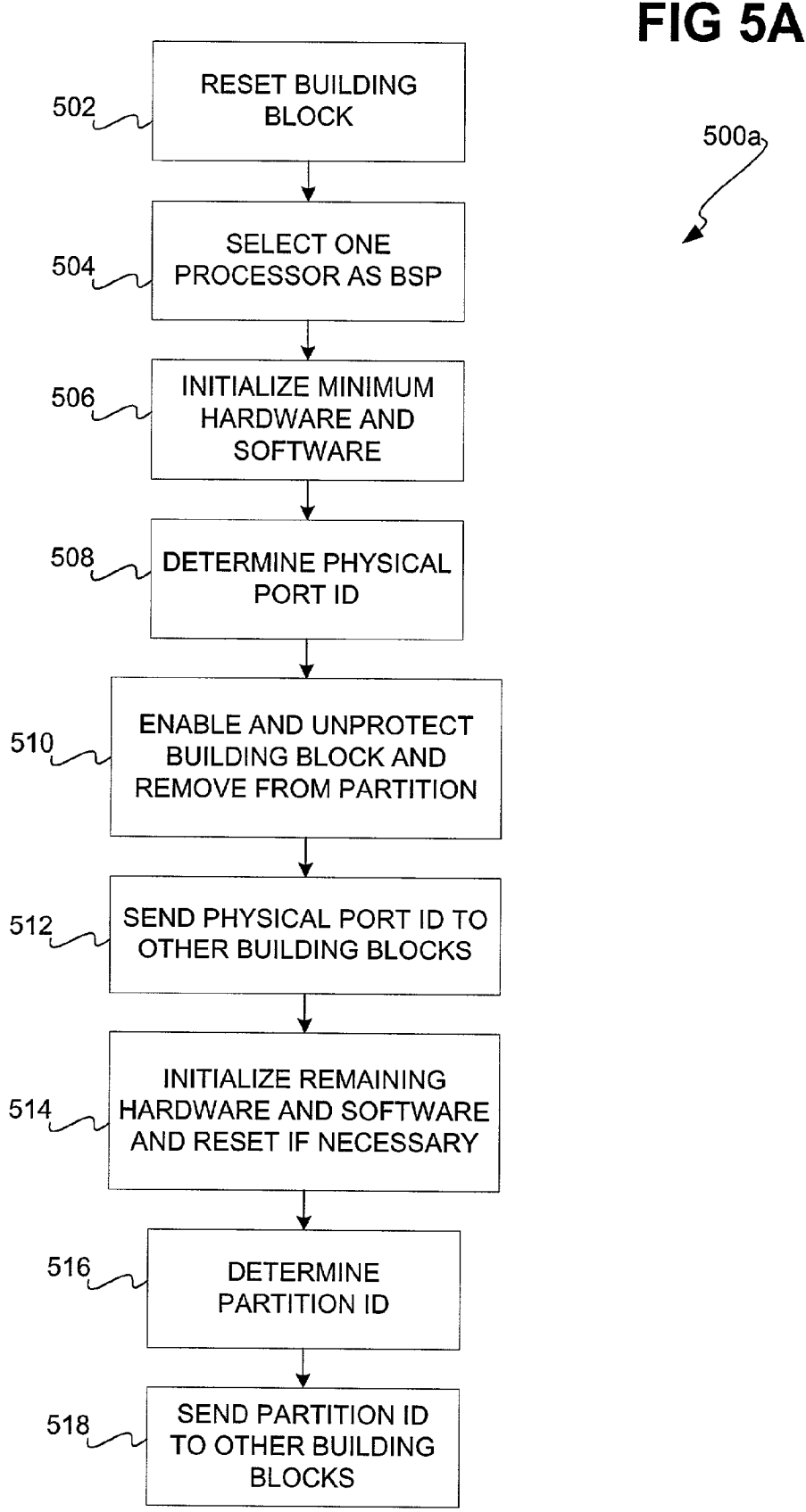
FIGS. 5A, 5B, 5C, and 5D are flowcharts of a method showing in more detail how one embodiment of the invention binds a building block of a platform to a partition of the platform, and is consistent with the method of FIG. 1.

FIGS. 5A, 5B, 5C, and 5D show how one embodiment of the invention binds building blocks of a platform to partitions of the platform, as the methods 500a, 500b, 500c, and 500d, respectively. The approach detailed in these figures is consistent with that of the method 100 of FIG. 1. The methods are performed by a building block of the platform relative to the other building blocks of the platform. The building block's status indicator is updated throughout the performance of these methods, to reflect the block's current status. Referring first to FIG. 5A, the building block is initially reset (502). This may include cycle resetting the building block, to start the boot process. Next, once all the processors of the building block have initialized themselves, one of these processors is selected as the boot service processor (BSP) for the building block (504), which performs the remainder of the methods 500a, 500b, 500c, and 500d.

The building block initializes its minimum necessary hardware and software (506), and determines its physical port identifier. The building block is enabled and unprotected, and removed from any partition to which it may currently be bound (508). Thus, the building block's protect indicator now indicates that the block is unprotected, and the building block's commit indicator now indicates that the block is not committed to any partition. The building block sends its physical port identifier to the other building blocks in the partition (512), and initializes any remaining hardware and software of the building block (514). This may entail resetting or rebooting the building block, such that the method 500a starts again at 502, and proceeds through 514. Once this has been accomplished, the building block determines its partition identifier (516), which is sent to the other building blocks of the platform (518).

Figure 5B:
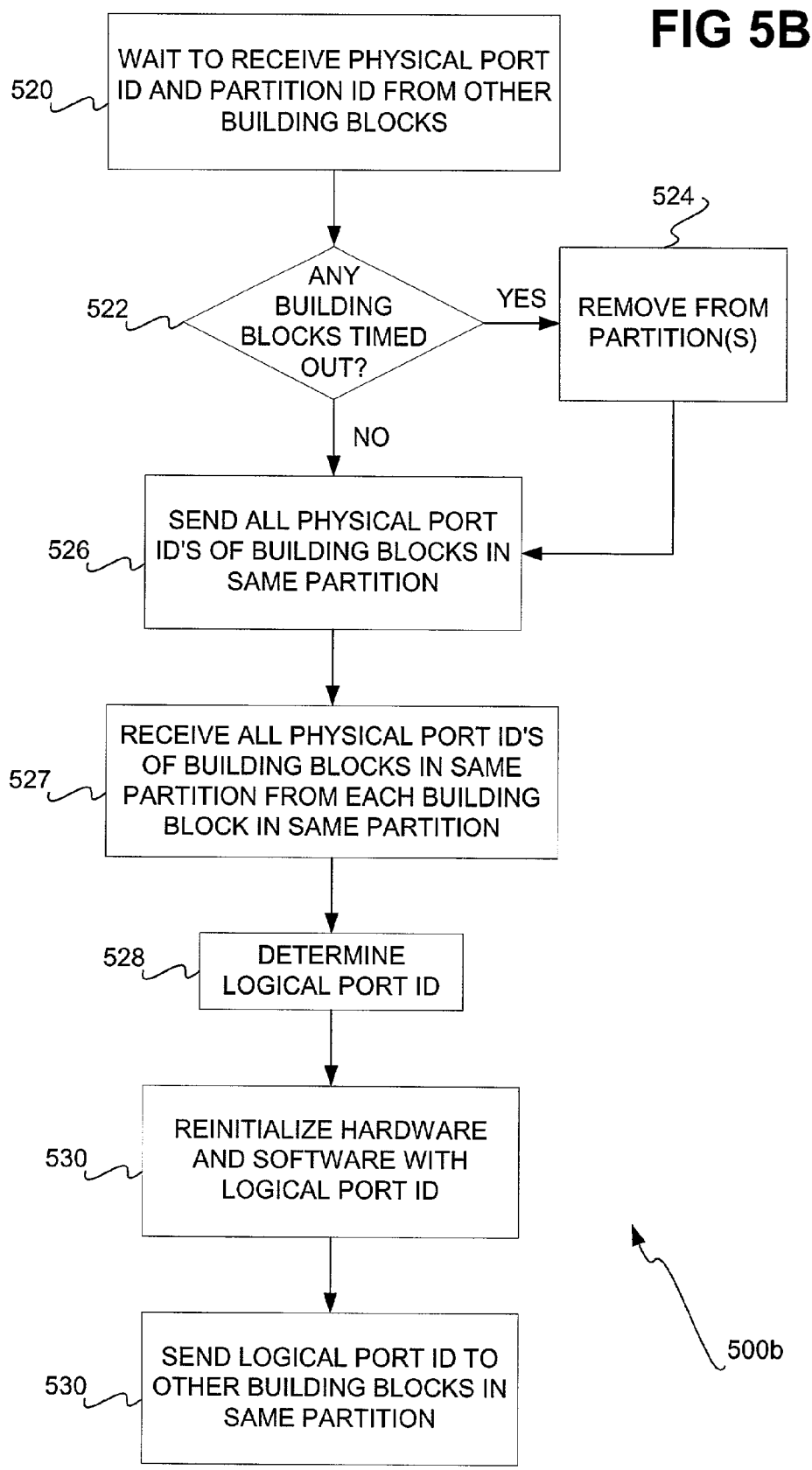

Referring next to FIG. 5B, the building block waits to receive the physical port identifiers and the partition identifiers of the other building blocks, from the other building blocks (520). This can entail waiting for a short period of time for the other building blocks to catch up through their performance of the method 500a of FIG. 5A. If any of the other building blocks is indicating only a physical port identifier, and not its partition identifier, then this likely means that such building blocks are resetting or rebooting themselves during performance of 514 of FIG. 5A, such that the waiting building block must wait for a longer period of time. The status indicator of such a building block can also be inspected.

One or more of the other building blocks may ultimately time out, meaning that they never send their physical port identifiers and/or their partition identifiers. If this occurs (522), then the method 500b removes such building blocks from any partitions to which they are currently bound (524). Next, the building block sends the physical port identifiers for all the building blocks having its same partition identifier to such building blocks (526). That is, the building block determines the subset of the other building blocks that have the same partition identifier as it does, and sends the physical port identifiers for these blocks to these blocks. Likewise, the building block receives from other building blocks in the subset these physical port identifiers (527).

The building block next determines its logical port identifier (528). The logical port identifier may be configured by the user or automatically generated based on the physical port identifiers of the building blocks in the same partition. The user may set the logical port identifier in-band through a setup program, or out-of-band through a service processor, where the identifier may then be stored in persistent storage. If the logical port identifier is not set by the user, then the building block with the lowest physical port identifier is assigned the lowest logical port identifier. The hardware and software of the building block is then reinitialized with the memory map for the logical port identifier assigned to the building block (530), and the logical port identifier is sent to the other building blocks in the same partition (532). At this stage, therefore, there is a different memory map for each building block, and the building blocks cannot access each other's memory.

Figure 5C:
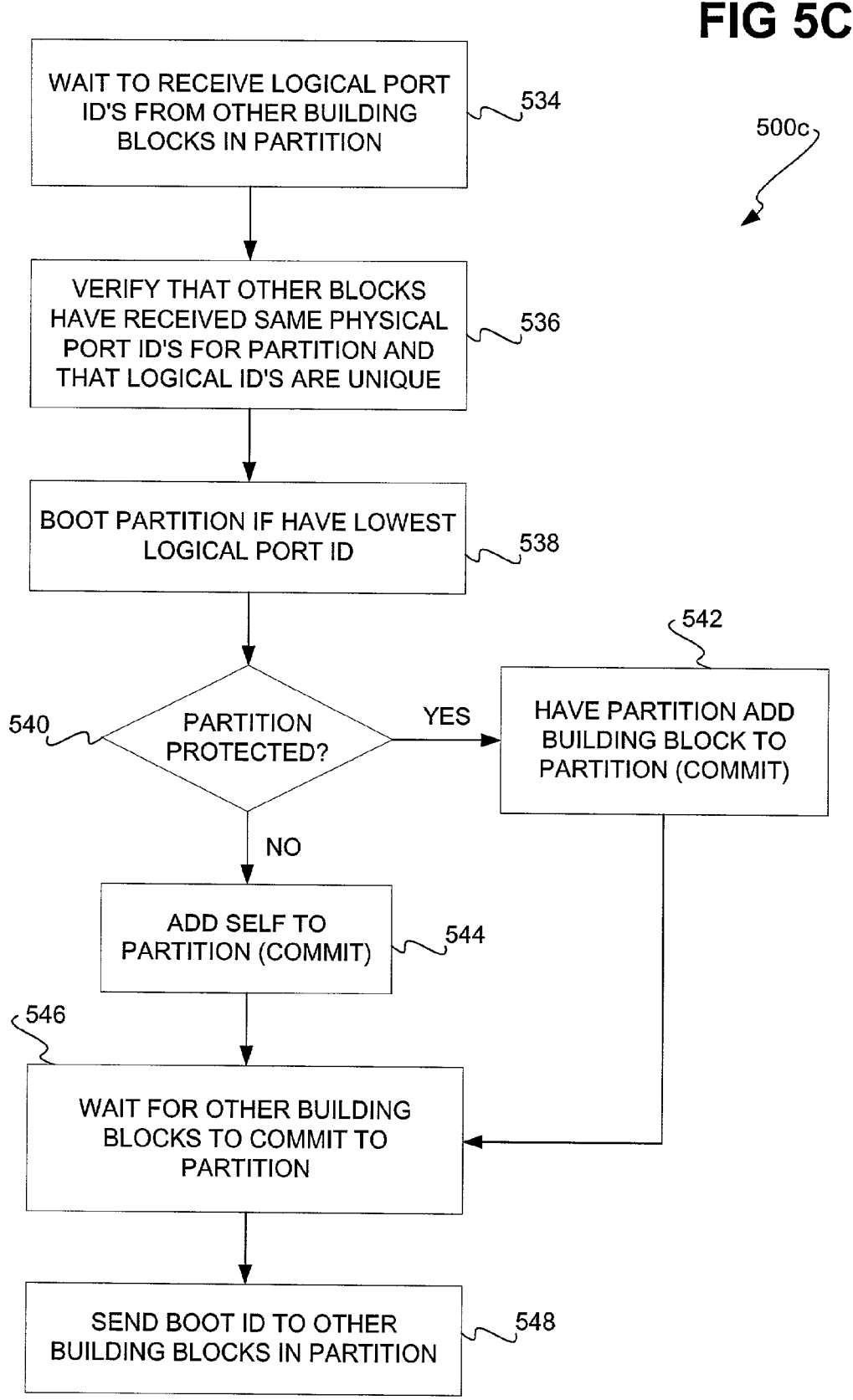

Referring next to FIG. 5C, the building block waits to receive the logical port identifiers from the other building blocks having the same partition identifier (534). This may entail the building block waiting for a long time for the other building blocks in the same partition to catch up and reinitialize their own software and hardware, where the status indicators of such building blocks can be examined to determine what they are currently doing. The building block then verifies that the other building blocks in the same partition have the same physical port identifiers indicating the same building blocks as belonging to the same partition (536). This verification ensures that all the building blocks having the same partition identifier have the same understanding as to the identities of the building blocks in this partition. Furthermore, the building block verifies that the logical port identifiers for these building blocks are unique.

If the building block performing the method 500c has the lowest logical port identifier, then it boots the partition (538). If the partition is protected (540), then the building block has the partition add it to the partition (542). That is, if the partition has already been protected by another building block, the building block performing the method 500c is added to the partition by the partition. This may be accomplished by online removal/insertion (OLRI) software running on the partition. However, if the partition is not yet protected (540), then the building block adds itself to the partition (544). In either case, the building block's commit indicator now indicates that the building block has been committed to the partition.

The building block next waits for a relatively short period of time for the other building blocks having the same partition identifier to commit to the partition (546). This can be accomplished by the building block examining the commit indicators of the other building blocks in the same partition, and waiting until all these indicators indicate that their respective blocks have committed to the partition. The building block also sends the boot identifier to the other building blocks in the same partition (548). The boot identifier is the smallest in value logical port identifier of the logical port identifiers of the building blocks having the same partition identifier. The boot identifier thus identifies the building block that is responsible for booting the partition—i.e., the boot building block.

Figure 5D:
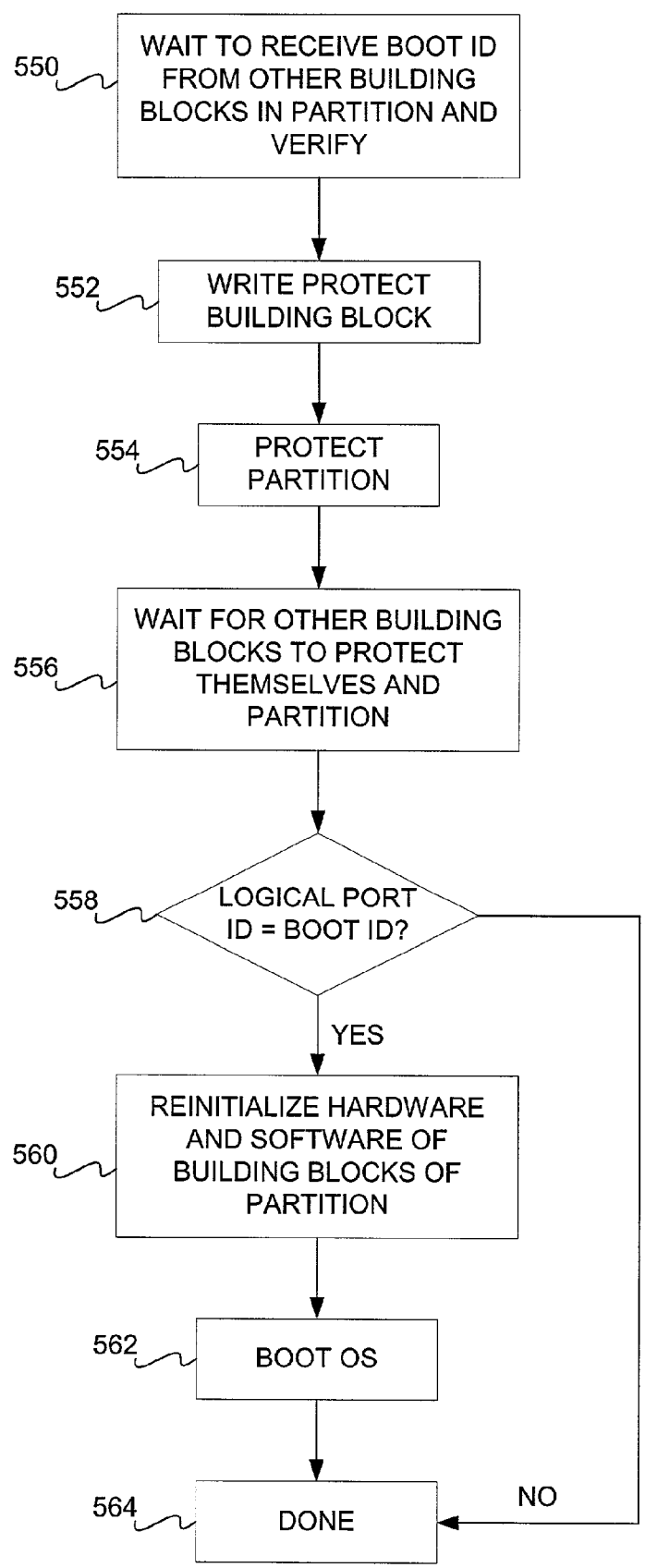

Referring finally to FIG. 5D, the building block waits to receive the boot identifier from the other building blocks in the same partition, and verifies that all these building blocks are indicating the same boot identifier (550). This verification is accomplished so that all the building blocks in the same partition have the same understanding as to which building block is responsible for booting the partition. The building block may wait for a relatively long period of time to receive the boot identifier from each of the other building blocks in the same partition. After verification, the building blocks of the partition can be accessed from anywhere else in the partition, such that there is a single memory map for the entire partition. Therefore, the software of these building blocks is reinitialized with the memory map for the partition.

The building block next write protects itself (552), as well as protects the partition (554). After write protecting itself, the building block has a protect indicator that indicates that the building block has been protected. The partition is protected from other building blocks, such that only the partition itself can subsequently add new building blocks to the partition. Such addition of new building blocks to the partition can be accomplished, for instance, by OLRI software running on the partition. The building block waits for the other building blocks in the same partition to protect themselves and the partition (556), by, for example, examining the protect indicators of these building blocks. This wait may be for a relatively short period of time.

If the logical port identifier of the building block is not the boot identifier (558), then the method 500*d* is finished (564). Otherwise, the BSP of the building block becomes the BSP for the partition, reinitializes all the hardware and software of the building blocks of the partition (560), and boots the operating system instance for the partition (562), before finishing (564). If the building block currently performing the method 500*d* is not the boot building block for the partition, then another building block in this partition performs 560 and 562 to initialize the partition and its operating system instance.

Software Implementation: Removing Building Blocks from Partitions

Figure 6:
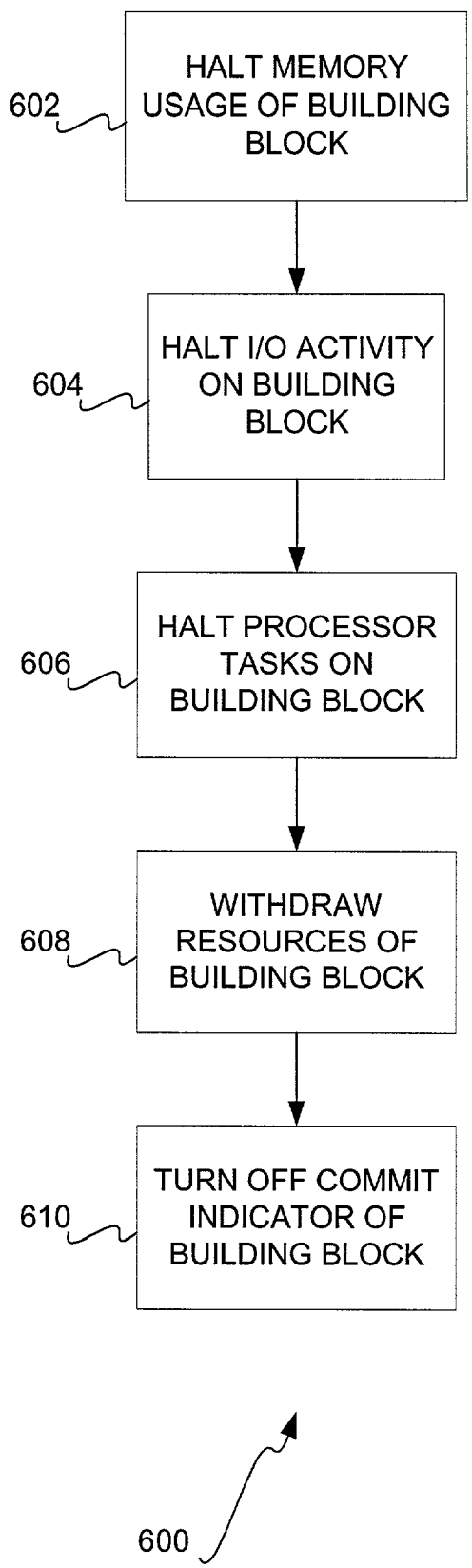
FIG. 6 is a flowchart of a method for removing a building block from a partition, according to an embodiment of the invention.

FIG. 6 shows how one embodiment of the invention unbinds, or removes, building blocks of a platform from partitions of the platform, as the method 600. The method 600 is performed by a building block of the platform. The building block's status indicator is updated throughout the performance of the method 600, to reflect the building block's current status. First, memory usage of the building block is halted (602). That is, the memory of the building block can no longer be used by other building blocks within the same partition.

Next, I/O activity on the building block is also halted (604). The building block thus cannot receive input from or provide output to other building blocks having the same partition identifier. Processor tasks on the building block are also halted (606). Such processor tasks may include those assigned by the partition for performance by the building block. The resources of the building block are then withdrawn from the partition (608). These resources can include the processing capability of the building block, the memory of the block, the storage of the block, and so on. Finally, the commit indicator of the building block is turned off (610), to indicate that the building block is no longer bound to the partition.

Hardware Implementation: Introduction

Within a multiprocessor system, at certain points where data is requested by a component or subsystem within the system, the identities of the requesters of the data are compared to a list of partitioned identifiers and partitioned membership lists, where the membership or the identities of the requesters are stored, depending on the configuration of the partitions. Requests are processed only in the case where the requester of data accesses resources that belong to a given defined partition to which the requestor is stored on a membership list. Requests for data are denied to resources that are not in the membership list of the partition to which the requestor is a member. The ability to allocate system resources in a multi-node (i.e., multi-building block) system dynamically between the partitions created and provides the means for protecting or isolating the partitions for accessing resources which are not within their partition is provided.

Partition configuration register means are used for each defined port providing for defined bit entries exclusively reserved for defining a given partition's enablement and a given partition's write protection as well as a port write protection. The hardware implementation of the preferred embodiment includes partition protection means comprised of register entries (bits) which enhance isolation of each partition by defining allowable access or writes from only those defined quads or nodes assigned to a given partition. The term node is used herein synonymously with the term building block. A global configuration register means is used to configure system-wide parameters that include defined bit entries exclusively for use in defining write protection for each defined partition.

Effective isolation of defined partitions within a multi-node system is provided preventing the possibility of overwriting data generated from an operation in a different partition from overriding data in a given partition to which said data was not meant to be written. Apparatus in the tag and address crossbar system of the multiprocessor system disclosed includes a tag comparator module and a dispatch module each separately capable of comparing a given tag's partition vector or requesting port to the required partition vector of an intended output port to prevent output of the tag to a port not defined for the given partition. Entries in a system global configuration register as well as registers that store the partition configuration of the various nodes are more particularly described in terms of the hardware implementation of the preferred embodiment as described in the subsequent section of the detailed description.

At least some embodiments of the present invention is applicable to multiprocessor computer systems that utilize multiple microprocessor groups or nodes, each of which is provided with its own input and output interfacing and memory systems, including memory control. Such multiprocessor systems typically partition physical memory associated with one local group of microprocessors into locally available memory and remote memory or remote cache for use by processors in other processor groups within a system. Multiple node microprocessor systems utilize tag and address crossbars as well as data crossbars to interconnect the various nodes or groups of microprocessors, thereby providing communications between such nodes.

In the hardware implementation of the preferred embodiment used to describe the present invention, it will be seen that a total of sixteen microprocessors are configured into four separate quads, each quad also being referred to as a node of the system. The nodes in the hardware implementation of the preferred embodiment are therefore a total of four, referred to in the disclosure as nodes 0, 1, 2 and 3.

In carrying out the invention, the method defines two translations that are used to resolve the target physical node identification (ID) for a given request for data in relation to partitioned membership and logical node ID. The term identification is used herein synonymously with the term identifier, and hence the acronym ID is also short for the term identifier. The first translation defines all the physical nodes within a system that are members of a partition, which has a unique partition ID (PartID). The second translation steers requests from a given partition to the physical target node to which the requested address refers. In addition to the target physical node, the physical node IDs of other interested nodes may need to be calculated.

ID, or identification or identifier, refers to a value or number that identifies a system node or resource owned by or located within the same node. In the hardware implementation of the preferred embodiment, a node (or quad or building block) includes four processors, associated memory and an input/output subsystem all interconnected through a system control agent, or controller all of which operate as a modular unit within the entire computer system. The memory control that interconnects the components within one group of processors, being one node, is interconnected to all the other node control agents through a tag and address crossbar system, as well as a data crossbar system.

A physical node ID is fixed based on the physical placement of the node in the interconnect crossbar systems, and every node has a unique physical node ID value that is consistent with its physical interconnection to the overall system. The physical node ID does not change if the node changes its partition ID or logical ID. In the invention, a partition ID is a virtual identifier that all physical nodes in a partition will share. Nodes with any other value for their partition ID are by definition not members of the given partition. If any two physical nodes share the same partition ID, they are both members of the same partition within the system. A logical ID is the node offset for a given address relative to the partition where the address was requested. The logical ID is unique to nodes within its own partition, but not necessarily unique relative to nodes in other partitions. In the implementation of the method disclosed herein, an address of a data request defines the logical ID of the node to which that address refers.

The Memory control always issues requests using physical addresses relative to its partition. The physical address is itself relative to its partition number. Since more than one partition may be using the tag and address crossbar at a time, the partition number must be used to distinguish one partition's physical address from another's. Therefore, each tag and address crossbar physical port will have a two-bit partition number programmed to allow incoming requests to label themselves with their partition number. The said partition number is concatenated with address bits 36:35 (the logical node ID from the systems memory map) to form a lookup index that is used to look up the physical ID number that is used to identify the node where the address is defined as Home. The tag and address crossbar uses the physical node ID to route requests, replies, responses, and data associated with the request. The tag and address crossbar uses these physical IDs to identify source and target nodes (called snID and tnID) and to select tag quadrants for tag accesses.

Tag accesses must be aware of partitions when they look for matches, perform updates, and check for conflicts. The tag and address crossbar will have a hardwired assignment of port numbers to physical pins on the typical application specific integrated circuit device (ASIC) (used as a memory control agent interconnecting the resources of one node to the tag and address crossbar), therefore port number and physical node ID are equal. Each port of the tag and address crossbar has two configuration variables: Assigned Partition and Logical Node ID. All ports in the same partition have the same value for Assigned Partition.

Within a partition, the Memory control on a port is home to a portion of the memory space; the unique space assigned to that Memory control is programmed into the Logical Node ID. Finally, the Partition Vector is a four-bit vector that identifies all the quads present in the partition to which that port belongs. The Partition Vector is actually calculated from the first two configuration variables of the four ports. The example below in Table 1 shows that Partition 0 consists of port 2 only, and that Partition 1 consists of ports 1, 3, and 0 as logical nodes 0, 1, and 2. Therefore, port 1 is the logical node 0 in partition 1 (is home to the address range of 0 to 32 GByte), and port 3 is node 1 in partition 1 (is home to the address range 32–64 GByte).

TABLE 1

Example of Partition Vectors

| Port ID | Assigned Partition | Logical Node ID | Partition Vector | Comment |
|---|---|---|---|---|
| 0 | 0 1 | 1 0 | 1 0 1 1 | Partition 1, logical id 2, physical id 0 |
| 1 | 0 1 | 0 0 | 1 0 1 1 | Partition 1, logical id 0, physical id 1 |
| 2 | 0 0 | 0 0 | 0 1 0 0 | Partition 0, logical id 0, physical id 2 |
| 3 | 0 1 | 0 1 | 1 0 1 1 | Partition 1, logical id 1, physical id 3 |

The tag and address crossbar will not propagate requests to ports that are not included in the Partition Vector of the port where the request was made. It may propogate requests and make replies to any or all of the ports that are included in the Partition Vector, as circumstances require. In the above example, a request from port 1 can be propagated to ports 0 and 3 because they are in port 1's Assigned Partition. The request cannot be propagated to port 2, nor can the tag for port 2's Remote Cache be modified in any way due to port 1's request.

Hardware Implementation: Details

The hardware implementation of the preferred embodiment relates specifically to a system and a method for use in a multiple processor system that utilizes a tagging and address crossbar system in combination with a data crossbar system, together with associated memory and control means comprising a data processing system. The disclosed embodiment is a means and a method that allows partitioning of the entire system such that distinct operating systems may run simultaneously across the system. The method and means demonstrated below permits a system using multiple processors with a processor group interface control system, and an address tag and crossbar system, to partition one or more processor groups into partitions by dividing resources such as system memory across the entire system but function independently for purposes of running separate operating system software on each separately partitioned group of one or more processors. System memory is divided among partitions but shared by the partition to which it is allocated.

Figure 7:
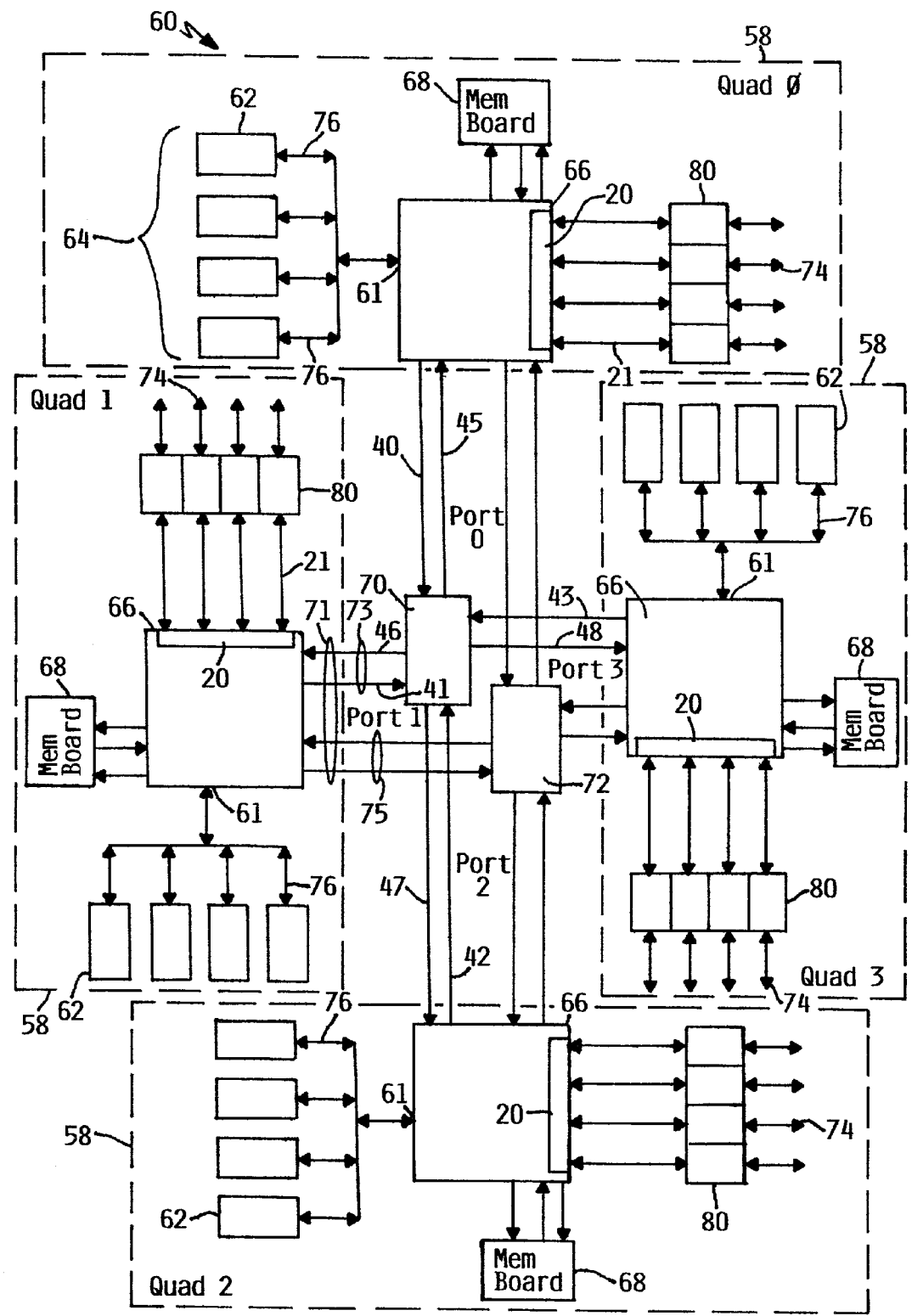
FIG. 7 is a block diagram of a typical multiprocessor system utilizing a data tag and address crossbar system in conjunction with a data crossbar system that an embodiment of the present invention may be employed to partition groups of processors to operate with independent operating systems.

FIG. 7 presents an example of a typical multiprocessor system in which the present invention may be used. FIG. 7 illustrates a multi-processor system that utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) that is developed for a particular system application to provide the interfacing for each microprocessor bus 76, each memory 68 associated with a given control agent 66, PCI interface bus 21, and PCI input/output interface 80, along with the associated PCI bus 74 that connects to various PCI devices. Bus 76 for each microprocessor is connected to control agent 66 through bus 61. Each PCI interface bus 21 is connected to each control agent 66 through PCI interface block bus 20.

FIG. 7 also illustrates the port connection between each tag and address crossbar 70 as well as data crossbar 72. As can be appreciated from the block diagram shown in FIG. 7, crossbar 70 and crossbar 72 allow communication between each control agent 66, such that addressing information and memory line and write information can be communicated across the entire multiprocessor system 60. Such memory addressing system is necessary to communicate data locations across the system and facilitate update of control agent 66 cache information regarding data validity and required data location.

A single quad processor group 58, also referred to as a quad 58, is comprised of microprocessors 62, memory 68, and control agent 66. In multiprocessor systems to which the present invention relates, quad memory 68 is usually Random Access Memory (RAM) available to the local control agent 66 as local or home memory. A particular memory 68 is attached to a particular controller agent 66 in the entire system 60, but is considered remote memory when accessed by another quadrant or control agent 66 not directly connected to a particular memory 68 associated with a particular control agent 66. A microprocessor 62 existing in any one quad processor group 58 may access memory 68 on any other quad processor group 58. NUMA (Non-Uniform Memory Access) systems typically partition memory 68 into local memory and remote memory for access by other quads.

Figure 8:
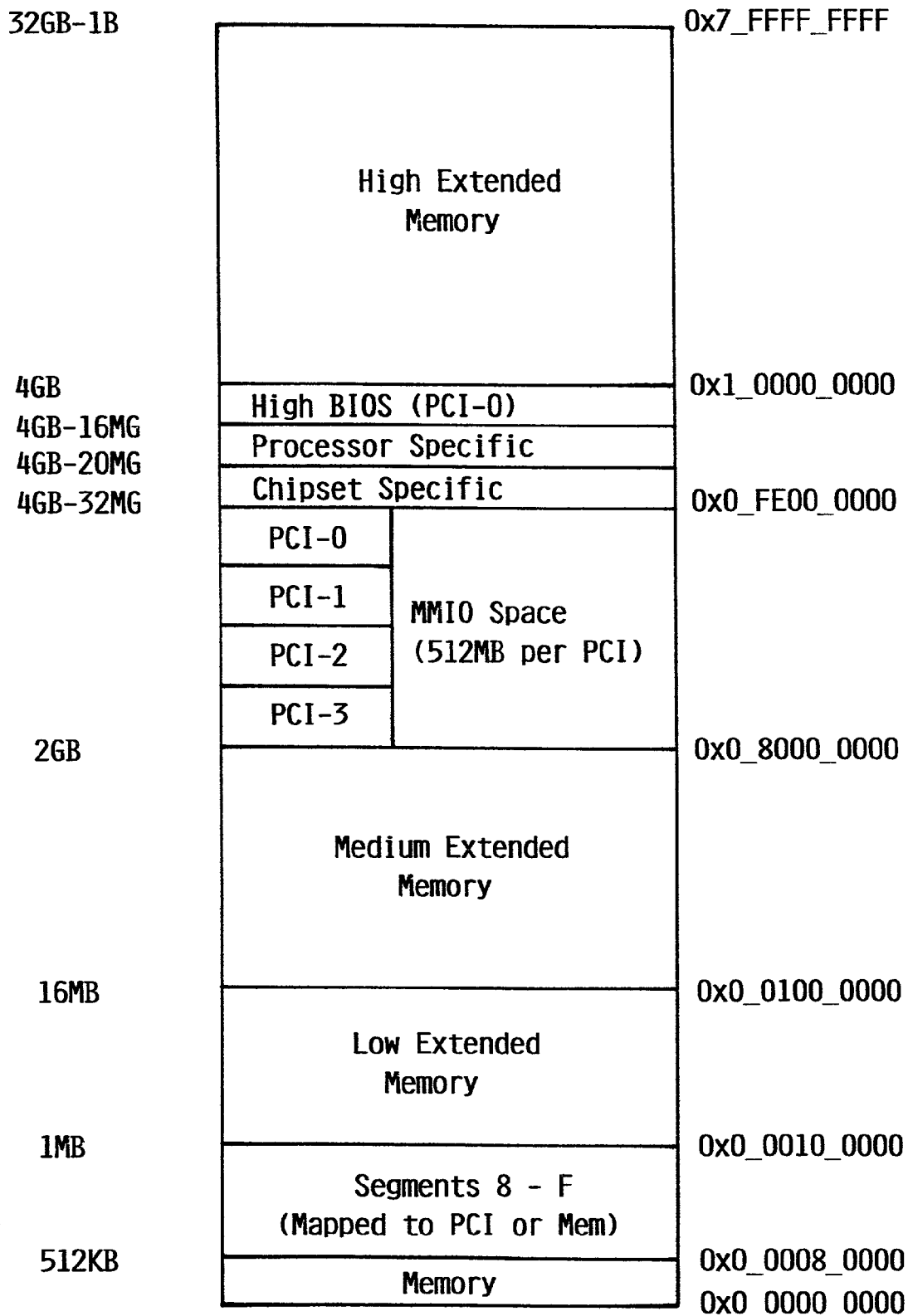
FIG. 8 is a diagram presenting an overview of the memory address map for the first processor group or quad in a given partition created by an embodiment of the invention.

In a typical multiprocessor system using distributed memory as shown in FIG. 7, the tag and address crossbar 70 allows partitioning a total of sixteen individual processors 62 shown in groups of four, into between one and four separate partitions. In describing the invention, reference will be made to a quad, also illustrated in the system diagram of FIG. 7. A quad, also a node in the present invention, operates as a separate node, each quad or node being interconnected to the rest of the system through ports that are associated with each quad. The memory map of a single quad of a multiprocessor system that uses the partitioning method is shown in FIG. 8. Each of the four quads 58 has one 32 GByte memory space allocated to it, of which 2 GByte is memory-mapped input/output (MMIO), CSRs (control and status data registers), and other non-memory addresses.

Each quad 58 is hardwired to a port of crossbar 70. Each quad 58 is configured with a partition ID and a logical ID. The partition ID (0, 1, 2, or 3) designates the quad's membership in an operating system and shared memory space. The logical ID (0, 1, 2, or 3) designates the quad's placement in the memory space of its partition. The logical ID specifies the physical address range that quad 58 treats as its local memory within that partition, i.e., the memory stored in its own memory 68. When a processor 62 requests an address that has the same logical region as its quad's logical ID, then the address is local to the processor or "home", otherwise it is "remote" to that processor.

The memory map of all quads in a partition is orthogonal to all addresses in another partition. System 60 can therefore be configured in any possible arrangement of partitions provided that each partition has a unique partition ID and each quad 58 has a unique logical ID within that partition. It should be appreciated that quad 58 is the smallest configurable unit in terms of partitioning a system using the preferred embodiment of the invention, as individual processors, IO (input/output) devices, or portions of memory 68 in quad 58 cannot be configured to different partitions. However the invention is equally applicable to partitionable systems comprising building blocks having fewer or more processor or I/O devices, or different arrangements and sizes of memory than the quads described herein, as well as to systems having fewer or more building blocks than the four described herein. Each quad is allocated a 128 MByte Remote Cache memory, which resides in the main memory 68 of each quad 58. Crossbar 70 maintains tags for each quad's Remote Cache.

As a system is configured with virtually identical processor groups (nodes) or quads 58, the entire system may be partitioned as a single system or up to four separate partitioned systems using the method disclosed. In the hardware implementation of the preferred embodiment, the maximum total number of quads 58 is four, as configured in FIG. 7. Every port of tag and address crossbar 70 is assigned to one of four control agents 66 by virtue of its physical connection between agent 66 and crossbar 70. Interconnections between tag and address crossbar 70 and data crossbar 72 to each of control agents 66 are accomplished through bus 71.

Shown in FIG. 7 as a connection from tag and address crossbar 70 and data crossbar 72 to the control agent 66 in quad one, the bus 71 is also referred to as a port. Though shown only at quad one, the configuration of bus 71 is duplicated for each quads 58 as can be appreciated by the connections for ports 0, 1, 2 and 3 shown in FIG. 7. Bus 73 is the portion of bus 71 that connects control agent 66 to tag and address crossbar 70. Bus 75 is the portion of bus 71 that connects the data crossbar 72 to each control agent 66. Each of the quads of the system demonstrated in FIG. 7, communicate to the remaining portions of the system through tag and address crossbar 70 as well as data crossbar 72 through channels defined as ports.

Ports 0, 1, 2 and 3 are all shown on FIG. 7 interconnecting the crossbar systems with the quadrant or node control agent 66 through input and output portions of each port, interconnecting each crossbar to each given quad. All of the processor groups or quads 58 in FIG. 7 are connected in a similar fashion, as can be appreciated from the figure, utilizing interconnect bus 71 as shown in port 1 of FIG. 7. The crossbar systems, including the ports interconnecting the crossbars with each of the quads 58 are essentially a communication pathway connecting the processing nodes so that they may all share access to data stored throughout the system.

Figure 11A:
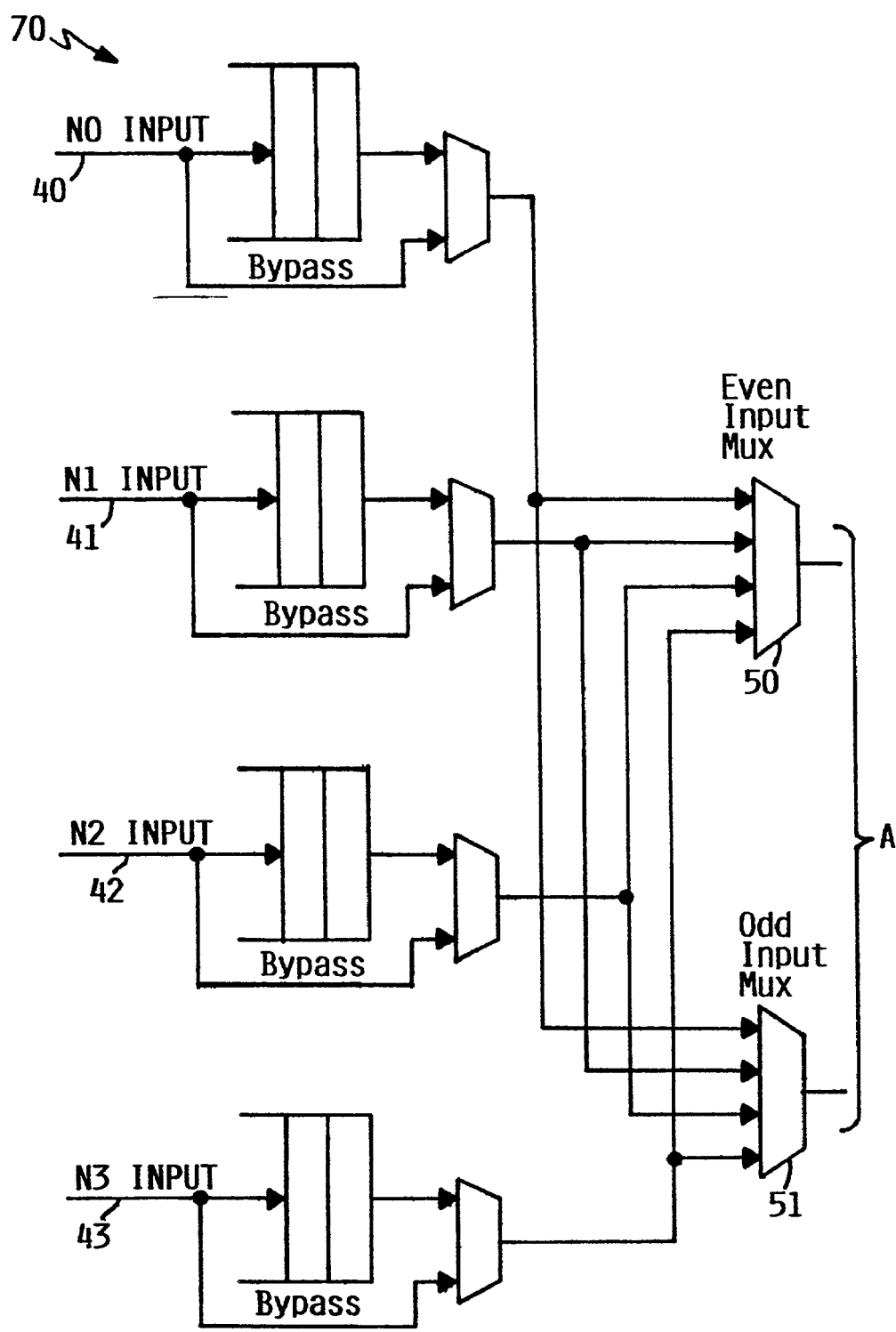
FIGS. 11A, 11B, and 11C are block diagrams of the tag and address crossbar system connecting each quadrant or node in a multiprocessor system in which an embodiment of the invention is used. A node is used herein synonymously with a building block.
Figure 11B:
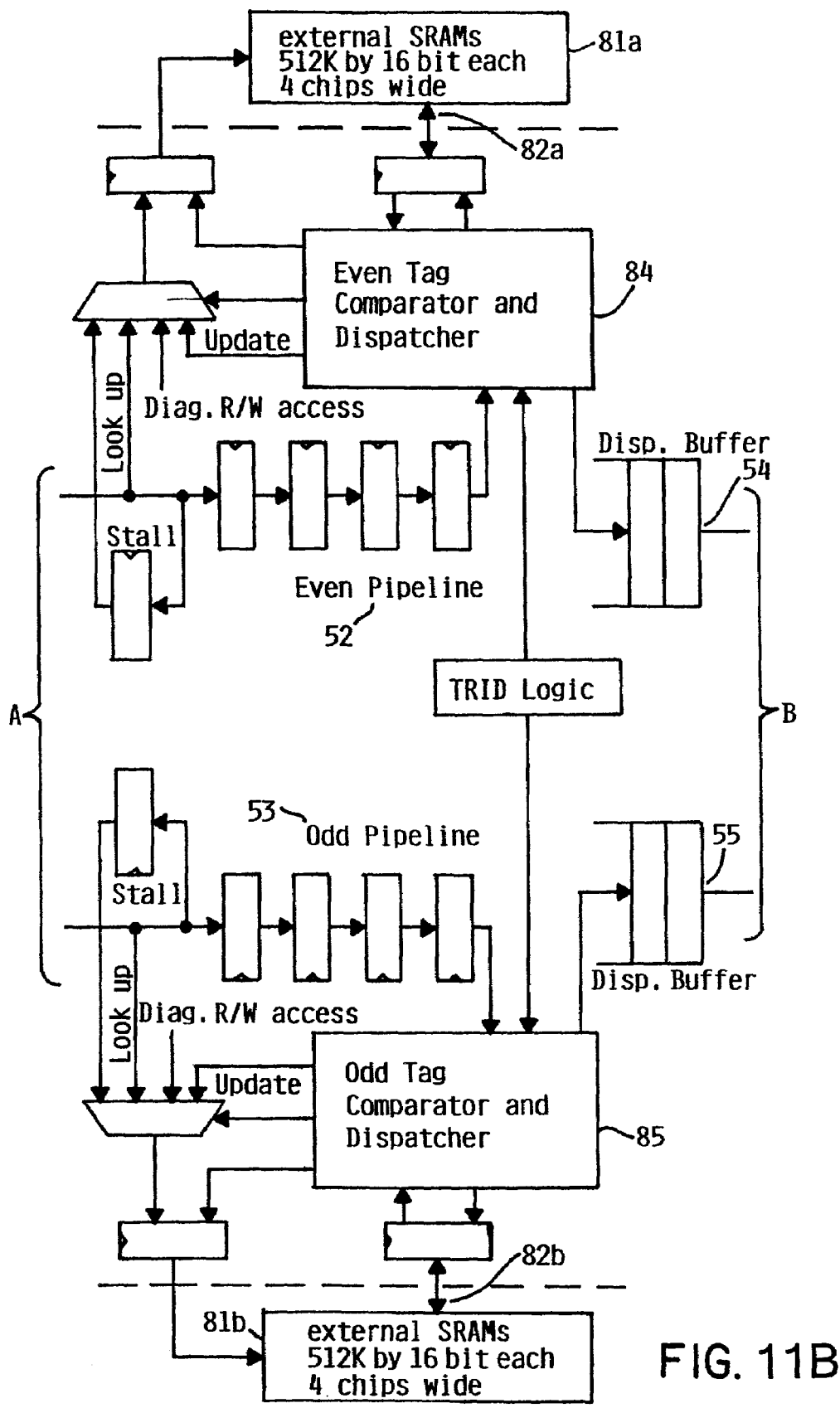
Figure 11C:
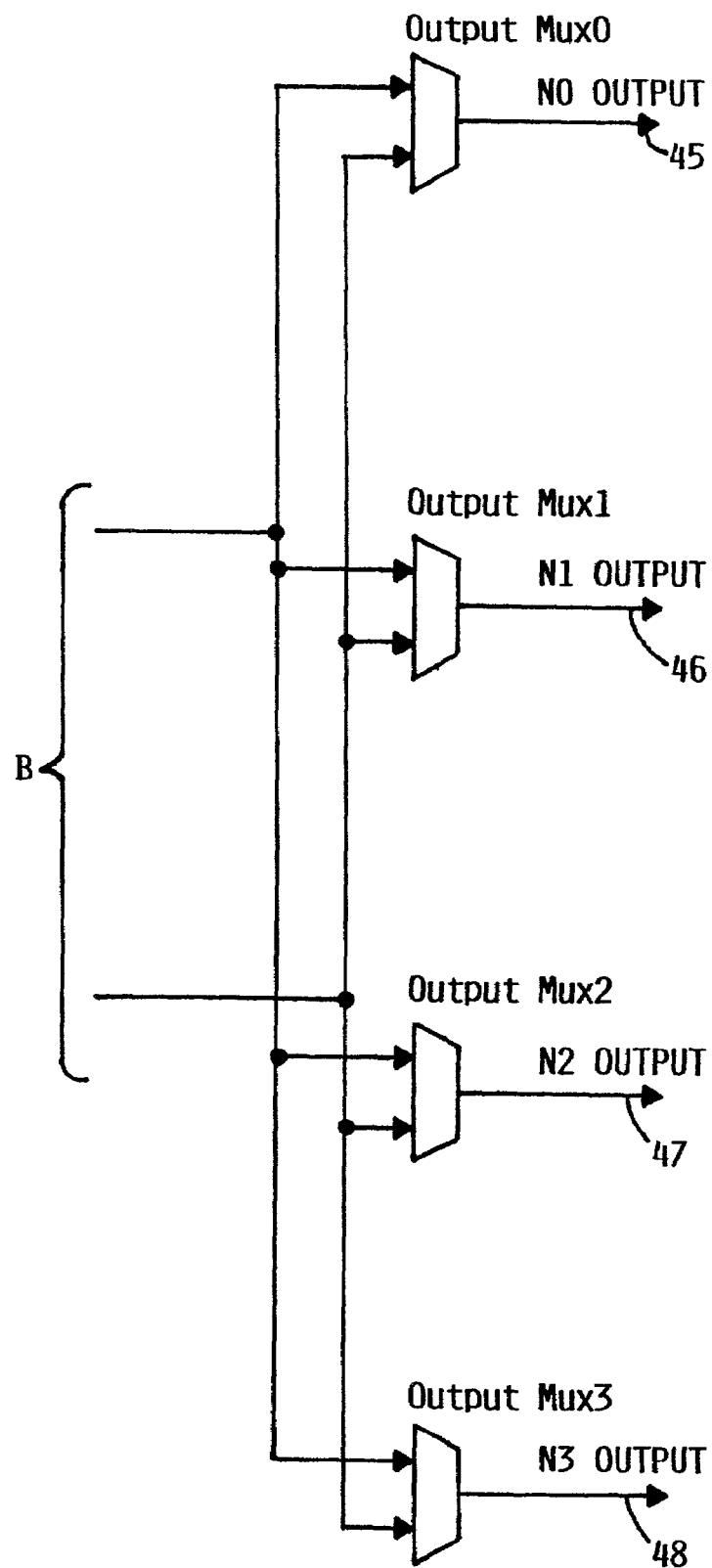

FIGS. 11A, 11B, and 11C illustrate internal logic of tag and address crossbar 70 shown in FIG. 7. Input 40 for port 0, input 41 for port 1, input 42 for port 2, and input 43 for port 4 illustrate part of the communications pathway connections each control agent 66 in each quad or node into tag and address crossbar 70. Likewise, FIGS. 11A, 11B, and 11C illustrate port 0 output 45, port 1 output 46, port 2 output 47 and port 3 output 48, each said output also illustrated on the entire system block diagram shown in FIG. 7. Tag look-up registers that function with tag and address crossbar 70 are shown at 81a and 81b. Registers 81a and 81b are identical except that they are associated with an even pipeline and odd pipeline for tag processing as illustrated in FIGS. 11A, 11B, and 11C. The dual pipeline design is provided to reduce latency in the system by assigning processing to even numbered tags to the even pipeline and odd numbered tags to the odd pipeline so that simultaneous processing may occur.

Continuing with FIGS. 11A, 11B, and 11C, input 40, 41, 42 and 43 are each introduced through a buffer, are operatively connected to even input multiplexer 50, and odd input multiplexer 51, the appropriate multiplexer (mux) being selected in accordance with the even or odd relationship with the input tag. Each multiplexer 50 and 51 serves to serialize the flow of tags from the four inputs. The outputs of multiplexer 50 and 51 are sent to another multiplexer to be sent ultimately to tag look-up registers 81a and 81b. Even pipeline logic 52 and odd pipeline logic 53 evaluates the tags being presented and the request type to generate an output response and requests for ports that are connected to a defined quad within its partition. The resulting output entries are buffered in the dispatch buffer 54 and 55, each of which is a first in, first out (FIFO) type buffer. Dispatch buffers 54 and 55 decouple timing variances between the tag logic shown and the output selection logic. Entries are stored in dispatch buffers 54 and 55 in first in, first out order until they can sent to the destination ports, being output 45, 46, 47 or 48, representing one output to each port or quad.

Tag look-up register 81a and 81b, identical in configuration, are made up of four SRAMS chips, each being 512 kbits by 16 bits in size. Tag look-up register 81a is connected through line 82a to even tag comparator and dispatcher 84. Though shown as one connection in FIGS. 11A, 11B, and 11C, connection 82a is actually four paths, each corresponding to inputs 0, 1, 2 and 3 from each port as described. Register 81b, connected to the odd tag comparator and dispatcher 85 through connection 82b is essentially identical in function. Path 82b is likewise comprised of four paths, each corresponding to a port. Tag look-up registers 81a and 81b is comprised of external memory chips that interface with crossbar 70, and are used to store the tag and state information for all of the remote cache tags in the entire system. Such information is not directly accessible by memory control agent 66, so all cacheable transactions generated in control agent 66 must access crossbar 70 to access or "snoop" crossbar 70's remote cache tags (RCTs).

Figure 12:
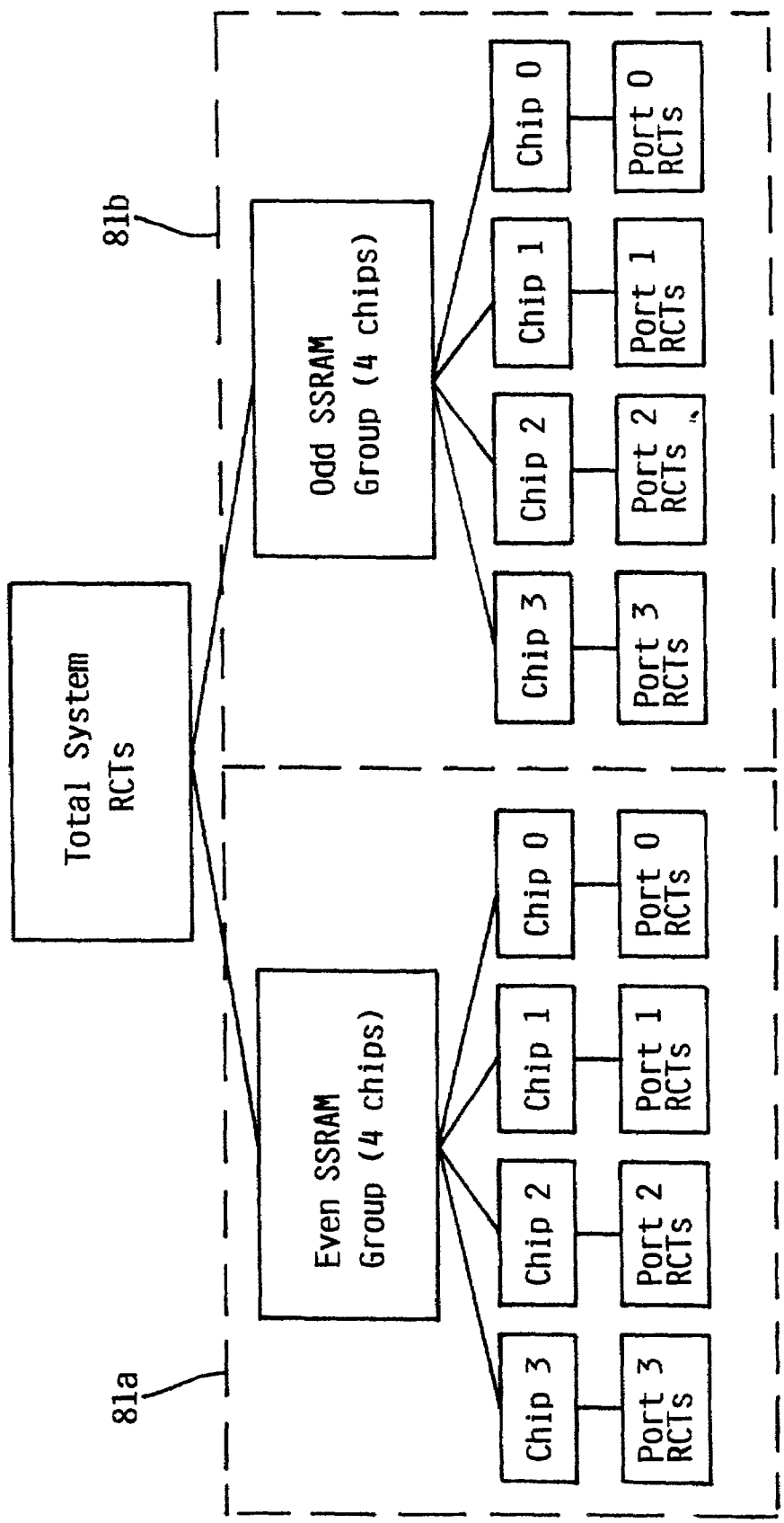
FIG. 12 is a block diagram of the mapping of the remote cache tags, according to an embodiment of the invention.

The physical configuration of register 81a and 81b is illustrated in the block diagram shown in FIG. 12. As shown in FIG. 12, register 81a and 81b is implemented with synchronous static random access memory chips (SSRAM) that operate at the internal clock frequency of crossbar 70, being 133 MHz in the present invention. As can be seen also in FIG. 12, there are two groups of external SSRAMs, the groups being divided to odd and even pipelines as shown on FIGS. 11A, 11B, and 11C. Each group of RCTs is split into four separate chips, with each separate chip representing a physical port of crossbar 70. As there are a total of four ports in the hardware implementation of the preferred embodiment as shown in the system diagram of FIG. 7, it can be appreciated that each port corresponds to a potential logical quad in the present invention, as earlier described. Therefore, each port of the RCT interface represents the RCTs for a physical quad's remote cache.

One means of partition data overwrite protection is handled by tag comparator and dispatcher 84 and 85 in FIGS. 11A, 11B, and 11C. Transactions being tracked by tag look-up register 81a and 81b can never be output to path 82a or 82b if such transactions are not defined to be in the partition to which such output would be writing. For example, in the four-node system illustrated in FIG. 7, if two partitions were defined, it can be seen that input 40 and 41 may belong to one partition while 42 and 43 are defined in a second partition. Tags being input into 40 and 41, through use of the present invention, are processed and eventually compared to determine whether they may be outputted from register 81a and 81b through connection 82a and 82b. In a two-partition system, the invention prevents possible outputting through those connections between registers 81a and b and comparators 84 and 85 on lines that would be defined strictly for input 42 and 43. Thus a level of protection for existing partitions is presented. Tag look-up register 81a and 81b keeps track, on a global basis, of a particular transaction's membership in a partition.

Further, considering FIGS. 11A, 11B, and 11C, data destined for a particular partition outputted from comparator and dispatcher 84 or 85 enters dispatch buffer 54 or 55, depending on whether the data is identified as even or odd as described above. Dispatch buffers 54 and 55 further provide partition overwrite protection by preventing a tag that is not defined as being within a particular partition from being dispatched to an output not defined as being within the partition in which the tag belongs. Accordingly, a second opportunity to protect separate partitions from errors occurring because of some failure or breakdown of the hardware or logic is provided.

Each port has configuration information that assigns its partition ID and logical ID (address range). The partition membership of each quad 58 is defined by the value of the partition ID field. Logical address range is defined by the setting of the logical ID field. Each port has a Commit and a Write Protect bit. The Commit bit verifies that the partition ID is valid; if Commit is not set, the partition ID is invalid and the effected quad 58 is thereby not a member of any defined partition, and thereby shares nothing with any other quad 58 in system 60.

The Write Protect bit allows a quad 58 to lock itself into a partition so that no other quad 58 can modify its configuration registers; a quad sets its Write Protect bit when it completes its boot sequence and partition integration tasks. When the Write Protect bit is set, any individual quad 58 always controls its own configuration and other quad 58 requesting a configuration change must do so by requesting the controlling quad 58 to make a configuration change.

When booting the system with quad 58, crossbar 70 provides a CSR (a hardware storage register accessible to software to and from which software can read and write)

Mapping Flag bits that allow communications between quads 58 even when such quads are in different partitions. Eight flag bits for each quad 58 may be written only for that effected quad 58 and all thirty-two flags can be read by any quad 58. The address spaces for different partitions cannot be violated by simple address pointer errors because crossbar 70 prevents requests from being sent to any quad 58 in another partition based on the partition ID of the inbound data request. Therefore, in accordance with the invention, inter-partition accesses could only occur because of possible hardware faults or scan operations.

Figure 9:
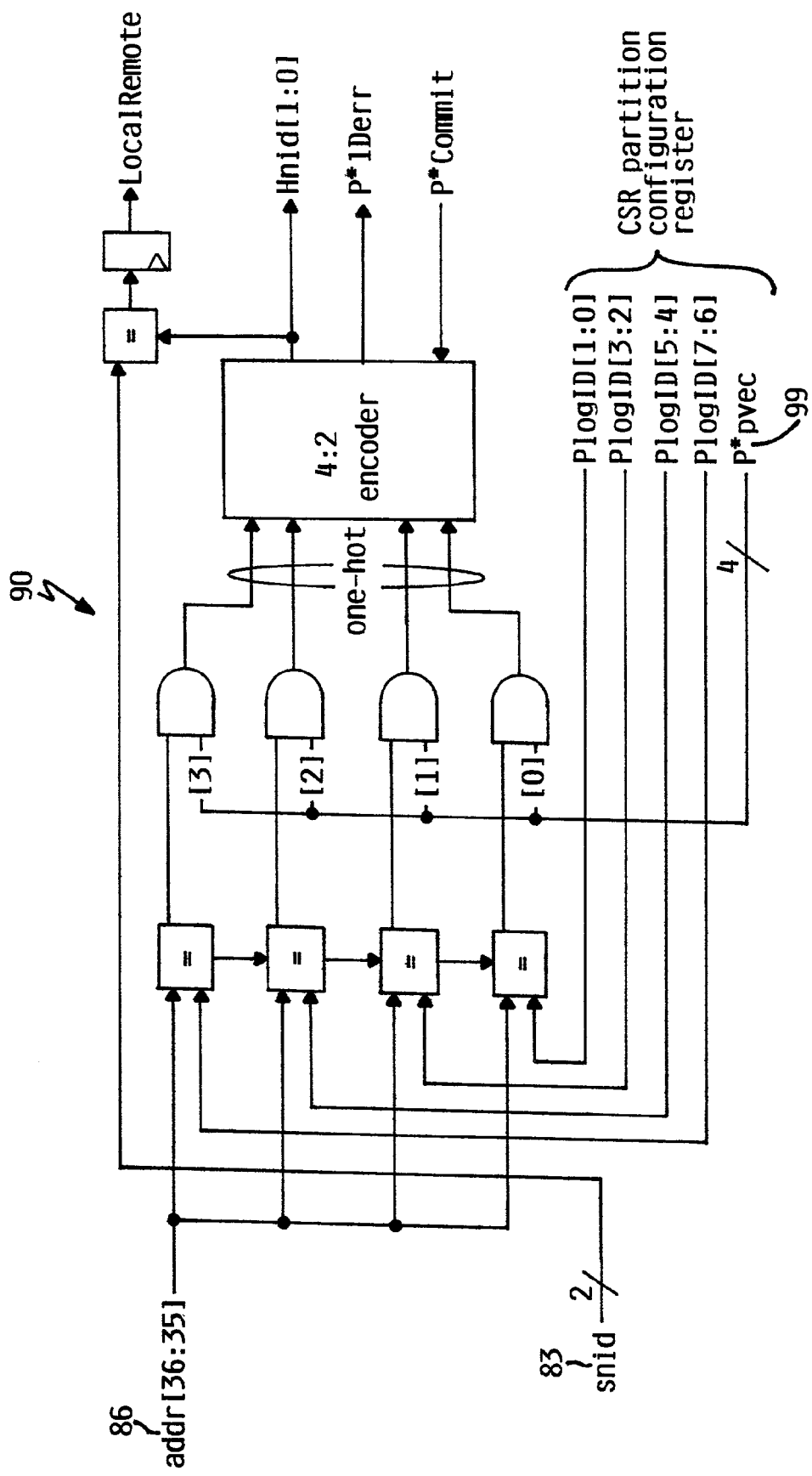
FIG. 9 is a logic diagram illustrating a physical port's hardware support for partitioning in accordance with an embodiment of the present invention.

FIG. 9 illustrates the logic utilized in supporting the partitioning of a physical port. FIG. 9 discloses the Home Port ID block 90 (Hop ID) that takes an incoming request of a target address and uses the logical target ID to determine the physical port that determines the physical port of which that request is home. Address bits [36:35] give the logical target ID of a request. They are compared to the programmed logical home ID of each of the potential output ports. PlogID is a vector coming from the CSR block. It gives the 2-bit logical home ID of each physical port that is programmed into a Partition Configuration Register. The comparison should result in at least one match. However, the same logical home ID may also exist in another partition, in which case there will be two matches. Therefore, it must be assured that the incoming and outgoing ports are in the same partition. A 4-bit partition vector is received by each instance of Hop ID 90. It should be understood that the asterisk symbol is used in the present disclosure to represent a multi-instant reference, sometimes also referred to in the art as a wild card character.

Figure 13:
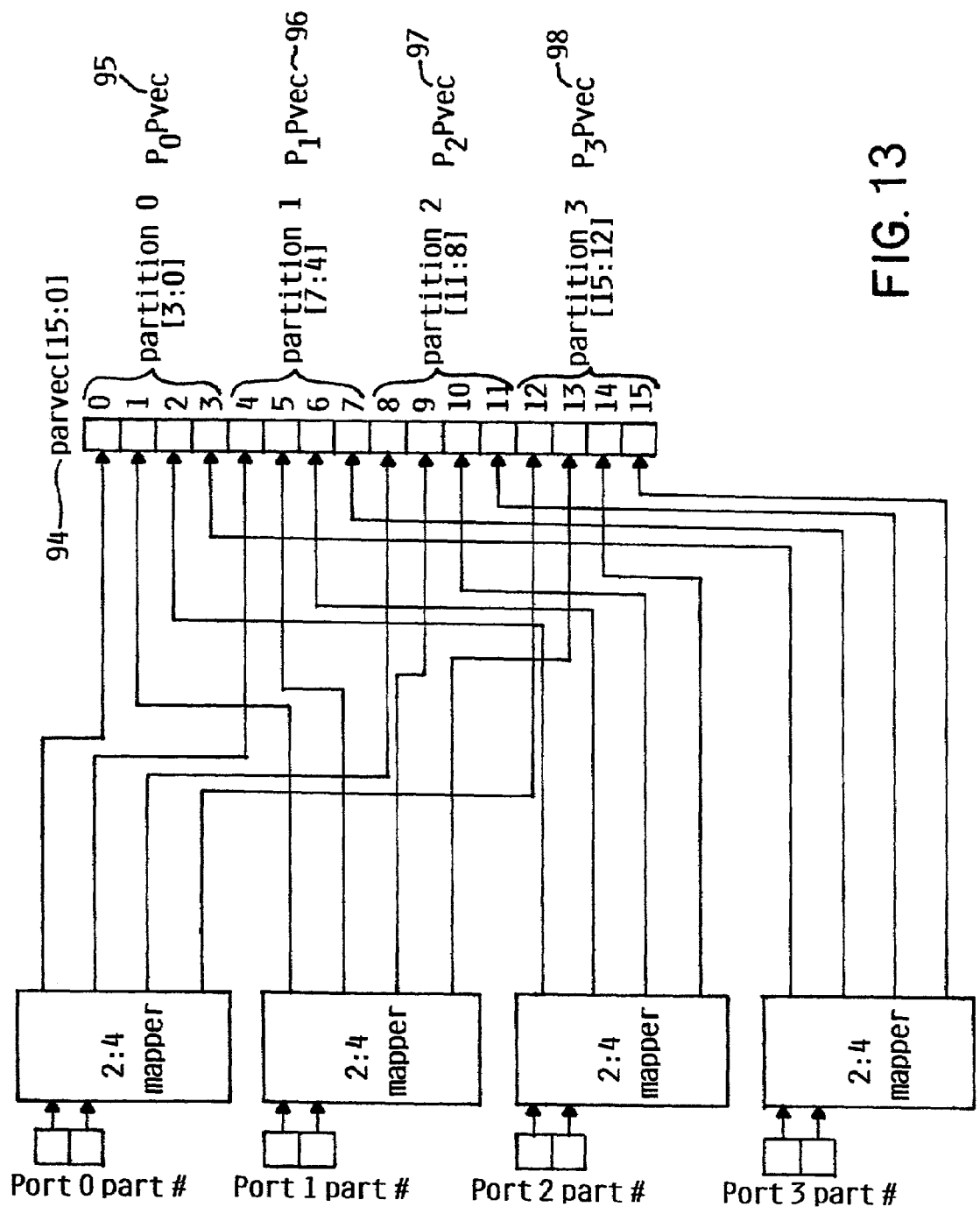
FIG. 13 is a logic diagram illustrating the global configuration register logic used to generate the partition vector bits used in carrying out an embodiment of the present invention.

FIG. 13 illustrates the logic diagram of the partition vector generated by the global configuration register in the invention. Partition vector 94, consisting of 16-bits, is comprised of four separate vectors, each made up of 4-bits. P*pvec is a separate 4-bit vector defining each port in the system as it relates to a particular partition. P0pvec 95 defines port membership in partition 0, P1pvec 96 defines membership in partition 1, P2pvec 97 defines membership in partition 2, and P3pvec 98 defines membership in partition 3—all of which is illustrated in the logic diagram shown in FIG. 13.

Each P*pvec shown in FIG. 13 is connected to P*pvec input 99 shown on FIG. 9. Homeport ID block 90 shown in FIG. 9 is reproduced for each port, being a total of four for the entire system disclosed. It will be appreciated that the 4-bit output of P*pvec shown in FIG. 13 will be connected in each instance to input 99 on FIG. 9. Each SNID 83 in FIG. 9, comprised of 2-bits, defines to which physical node block 90 is attached, being node 0, 1, 2, or 3 in the system. Address 86 in FIG. 9 is comprised of the logical ID of the target address, comprised of 2-bits. P*pvec has each bit set or cleared to indicate which physical ports are in the partition to which this inbound port belongs. For example, if partition 0 includes physical ports 0 and 2 then P*pvec would be 0101b. The partition vector is used as a mask to qualify the comparisons of the address bits and PlogID. There should be one and only one remaining match, which is fed into a 4:2 encoder to produce the home node ID (HnID). The 4:2 encoder values are shown in Table 2.

TABLE 2

| 4:2 encoder values | |
|---|---|
| one-hot input vector | HnID |
| 0001 | 00 |
| 0010 | 01 |
| 0100 | 10 |
| 1000 | 11 |
| others | error |

The HnID is the physical port ID that corresponds to the logical target ID. P*IDerr is asserted if there is not exactly one match and P*Commit is asserted. P*Commit comes from the CSR block and is set when this inbound port is committed to a partition. The HnID indicates which physical port has been configured to be home for that address in this partition. It is used to route requests, replies, responses, and data associated with the request to the appropriate tag and address crossbar 70 output port. HnID is delivered to the Input mux during the AD phase.

Continuing with the example above, assume the logical home IDs are configured so that Port 0 has logical ID 00b, Port 1 logical ID 10b, Port 2 logical ID 10b and Port 3 logical ID 01b. PlogID will be 68 h. A transaction coming into Port 0 with addr[36:35] of 10b is compared with PlogID. There will be a match of the logical ID of both Port 1 and Port 2 and the vector out of the comparators will be 0110b. After it is summed with the partition vector of 0101b, the result is the one-hot vector 0100b, from which the encoder provides a HnID of 10b. The match with Port 1 that is not in the same partition has been masked out. The transaction will be processed knowing that the home port is physical Port 2 based on the HnID of 10b. If the HnID is equal to the snID 83, (physical node ID), then the request is local, and LocalRemote is asserted to the TypeCk block. Otherwise it is remote and LocalRemote is de-asserted. It is delayed by a clock to arrive during the ID phase of the transaction. Table 3 illustrates the content of the partition configuration register, a graphical representation of which is shown in FIG. 14 as an example of the register for port 0.

TABLE 3

| Partition Configuration Register | | | |
|---|---|---|---|
| Name | Bits | Read/Write | Definition |
| Port 0 Partition Write Protect | 1 | Rd/Wr | When set, and Port 0 Committed is set, prevents any Port Committed bit from transitioning from 0 to 1 if the associated Partition # bits match the Port 0 Partition bits unless the CSR write is from a port already committed to the partition. |
| Port 0 Write Protect | 1 | Rd/Wr | Prevents changes to the partition information associated with this port. If this bit is set CSR writes only from this port may change the contents of the bits associated with this port, including this Write Protect bit. |

TABLE 3-continued

Partition Configuration Register

| Name | Bits | Read/Write | Definition |
| --- | --- | --- | --- |
| Port 0 Committed | 1 | Rd/Wr | Indicates that the Quad is committed to the partition (below). |
| Port 0 Partition # | 2 | Rd/Wr | Partition number to which the Quad attached to this port belongs. |
| Port 0 Logical Node # | 2 | Rd/Wr | Logical node number within the partition that this port represents. This field determines the address range owned by the Quad attached to this port |
| Port 0 Enable | 1 | Rd/Wr | When set this bit enables port 0 subject to certain conditions. If clear, port 0 is disabled and will not respond to port 0 inbound transactions. |
| Port 1 Partition Write Protect | 1 | Rd/Wr | When set, and Port 1 Committed is set, prevents any Port Committed bit from transitioning from 0 to 1 if the associated Partition # bits match the Port 1 Partition bits unless the CSR write is from a port already committed to the partition. |
| Port 1 Write Protect | 1 | Rd/Wr | Prevents changes to the partition information associated with this port. If this bit is set CSR writes only from this port may change the contents of the bits associated with this port, including this Write Protect bit. |
| Port 1 Committed | 1 | Rd/Wr | Indicates that the Quad is committed to the partition (below). |
| Port 1 Partition # | 2 | Rd/Wr | Partition number to which the Quad attached to this port belongs. |
| Port 1 Logical Node # | 2 | Rd/Wr | Logical node number within the partition that this port represents. This field determines the address range owned by the Quad attached to this port |
| Port 1 Enable | 1 | Rd/Wr | When set this bit enables port 1 subject to certain conditions. If clear, port 1 is disabled and will not respond to port 1 inbound transactions. This bit is cleared at power-on reset |
| Port 2 Partition Write Protect | 1 | Rd/Wr | When set, and Port 2 Committed is set, prevents any Port Committed bit from transitioning from 0 to 1 if the associated Partition # bits match the Port 2 Partition bits unless the CSR write is from a port already committed to the partition. |
| Port 2 Write Protect | 1 | Rd/Wr | Prevents changes to the partition information associated with this port. If this bit is set CSR writes only from this port may change the contents of the bits associated with this port, including this Write Protect bit. |
| Port 2 Committed | 1 | Rd/Wr | Indicates that the Quad is committed to the partition (below). |
| Port 2 Partition # | 2 | Rd/Wr | Partition number to which the Quad attached to this port belongs. |
| Port 2 Logical Node # | 2 | Rd/Wr | Logical node number within the partition that this port represents. This field determines the address range owned by the Quad attached to this port |
| Port 2 Enable | 1 | Rd/Wr | When set this bit enables port 2 subject to certain conditions. If clear, port 2 is disabled and will not respond to port 2 inbound transactions. |
| Port 3 Partition Write Protect | 1 | Rd/Wr | When set, and Port 3 Committed is set, prevents any Port Committed bit from transitioning from 0 to 1 if the associated Partition # bits match the Port 3 Partition bits unless the CSR write is from a port already committed to the partition. |
| Port 3 Write Protect | 1 | Rd/Wr | Prevents changes to the partition information associated with this port. If this bit is set CSR writes only from this port may change the contents of the bits associated with this port, including this Write Protect bit. |
| Port 3 Committed | 1 | Rd/Wr | Indicates that the Quad is committed to the partition (below). |
| Port 3 Partition # | 2 | Rd/Wr | Partition number to which the Quad attached to this port belongs. |
| Port 3 Logical Node # | 2 | Rd/Wr | Logical node number within the partition that this port represents. This field determines the address range owned by the Quad attached to this port |
| Port 3 Enable | 1 | Rd/Wr | When set this bit enables port 3 subject to certain conditions. If clear, port 3 is disabled and will not respond to port 3 inbound transactions. |

Table 4 is a table of possible partition member register entries. The partition member register is read only. Its contents are calculated from the partition configuration register shown above in Table 3. It will be appreciated by review of Table 4 that the entries define the partition membership of each port, and therefore each quad.

TABLE 4

Partition Member Register

| Name | Bits | Read/Write | Definition |
| --- | --- | --- | --- |
| Partition 0-Port 0 | 1 | Rd Only | Set if Port 0 is a member of partition 0 |
| Partition 0-Port 1 | 1 | Rd Only | Set if Port 1 is a member of partition 0 |
| Partition 0-Port 2 | 1 | Rd Only | Set if Port 2 is a member of partition 0 |
| Partition 0-Port 3 | 1 | Rd Only | Set if Port 3 is a member of partition 0 |
| Partition 1-Port 0 | 1 | Rd Only | Set if Port 0 is a member of partition 1 |
| Partition 1-Port 1 | 1 | Rd Only | Set if Port 1 is a member of partition 1 |
| Partition 1-Port 2 | 1 | Rd Only | Set if Port 2 is a member of partition 1 |
| Partition 1-Port 3 | 1 | Rd Only | Set if Port 3 is a member of partition 1 |
| Partition 2-Port 0 | 1 | Rd Only | Set if Port 0 is a member of partition 2 |
| Partition 2-Port 1 | 1 | Rd Only | Set if Port 1 is a member of partition 2 |
| Partition 2-Port 2 | 1 | Rd Only | Set if Port 2 is a member of partition 2 |
| Partition 2-Port 3 | 1 | Rd Only | Set if Port 3 is a member of partition 2 |
| Partition 3-Port 0 | 1 | Rd Only | Set if Port 0 is a member of partition 3 |
| Partition 3-Port 1 | 1 | Rd Only | Set if Port 1 is a member of partition 3 |
| Partition 3-Port 2 | 1 | Rd Only | Set if Port 2 is a member of partition 3 |
| Partition 3-Port 3 | 1 | Rd Only | Set if Port 3 is a member of partition 3 |

Table 5 provides the definitions of the port flag register.

TABLE 5

Port Flag Register

| Name | Bits | Read/Write | Definition |
| --- | --- | --- | --- |
| Port 0 Flag | 8 | Rd/Wr | These bits can be written only by port 0, but can be read by any port. |
| Port 1 Flag | 8 | Rd/Wr | These bits can be written only by port 1, but can be read by any port. |
| Port 2 Flag | 8 | Rd/Wr | These bits can be written only by port 2, but can be read by any port. |
| Port 3 Flag | 8 | Rd/Wr | These bits can be written only by port 3, but can be read by any port. |

Table 6 illustrates the port identification register.

TABLE 6

{tc \13 "Table 6}Port ID Register

| Name | Bits | Read/Write | Definition |
| --- | --- | --- | --- |
| Port ID | 2 | Rd | Returns the ID of the port to which the access was made. |

Tag and address crossbar 70 Control and Status Registers (CSRA) hold initialization, configuration, control, and status information relating to various features and operations within tag and address crossbar 70. They all may be accessed either by scan or from control agent 66 through a serial CSR interface to tag and address crossbar 70. CSRs are either port specific or global. Port specific registers relate to a particular bus 73 port. Each port has its own set. Port specific registers are further divided into performance counters and kernel categories. The kernel category consists of configuration and diagnostic registers, for which access should be restricted. Each category is aligned on a 16 k page boundary. Global registers pertain to Tag and address crossbar 70 as a whole. There is only one copy of a global register, which is seen in the address space of each of the ports.

Each quad 58 in the system 60 has 64 KB of tag and address crossbar 70 CSR memory space, each at a specific address range. These addresses appear in the address space of all quads in a partition, and are therefore referred to as Shared CSR addresses. In addition, each quad 58 has 64 KB of local tag and address crossbar 70 CSR memory space. Accesses to Local CSR memory space are routed to the CSRs associated with the physical port that receives the access. Therefore, registers are only accessible at the Local CSR address through the port to which they are local.

Figure 10:
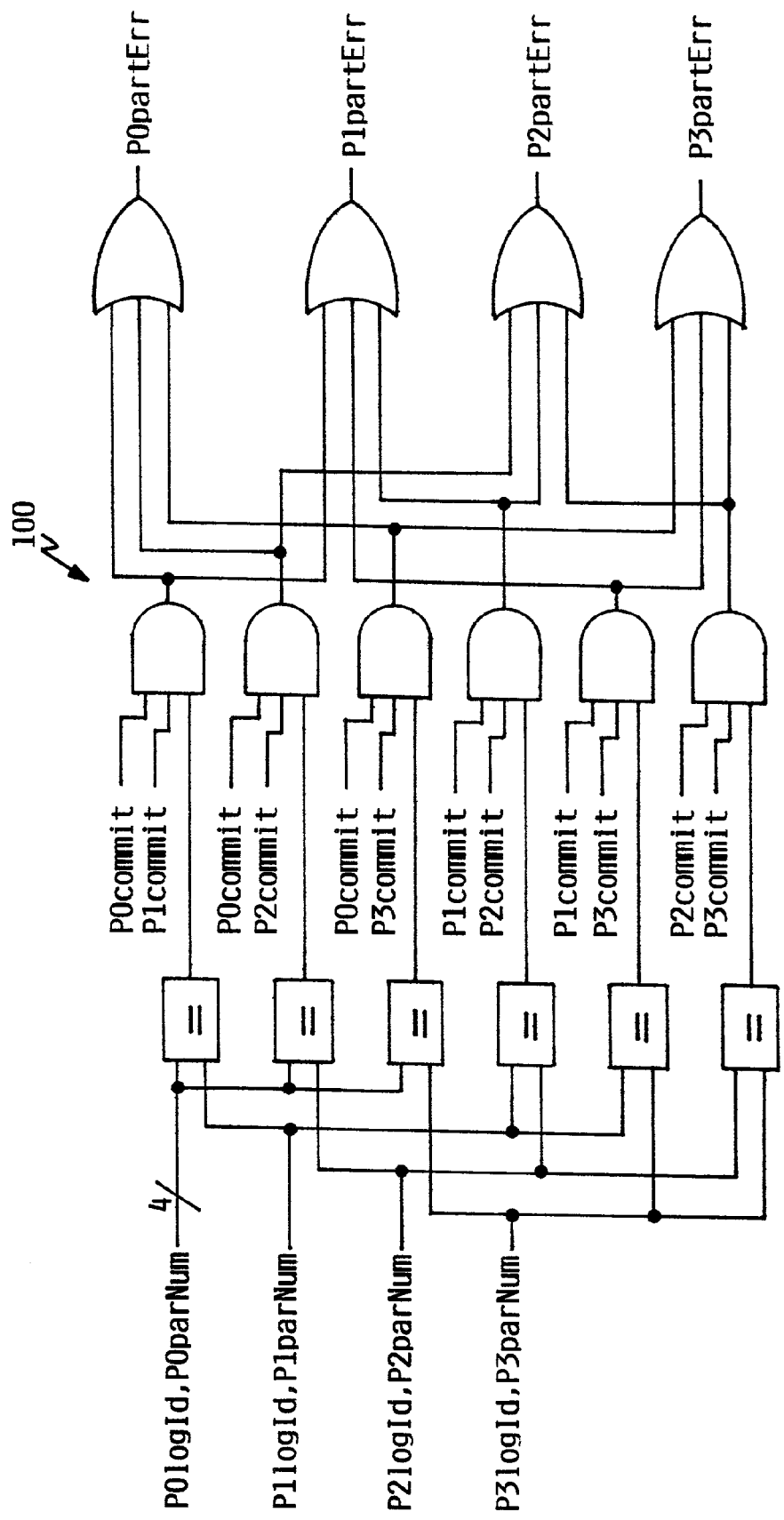
FIG. 10 is a logic diagram illustrating the global register block that includes the partition error detection logic used in carrying out an embodiment of the present invention.

The global register block logic is shown in FIG. 10. In addition to holding the global category of CSR registers, the Global Register block 100 performs other logical services. It will check for partition inconsistencies, where a port is being configured to have the same logical ID as a Port that is already committed to the partition. P*logID is the two bit logical ID value programmed for each port. P*parNum is the two-bit partition number programmed for each port. Only ports that are already committed to a partition are considered. The error is flagged when the duplicate P*parNum and P*logID are written and the P*Commit bits are set.

The CSR Global Register block is also responsible for generation of the partition vector (parvec), the 16-bit vector that collectively summarizes the status of all bus 73 ports that are included in the four possible partitions in the system shown in the hardware implementation of the preferred embodiment. It is used internally to tag and address crossbar 70 and is also visible as a CSR register. There is a programmable 2-bit field for each bus 73 port that contains the number of the partition to which the port belongs. These port references are listed in Table 7.

TABLE 7

Port References

| Port Partition # | Vector |
| --- | --- |
| 00 | 0001 |
| 01 | 0010 |
| 10 | 0100 |
| 11 | 1000 |

Figure 15:
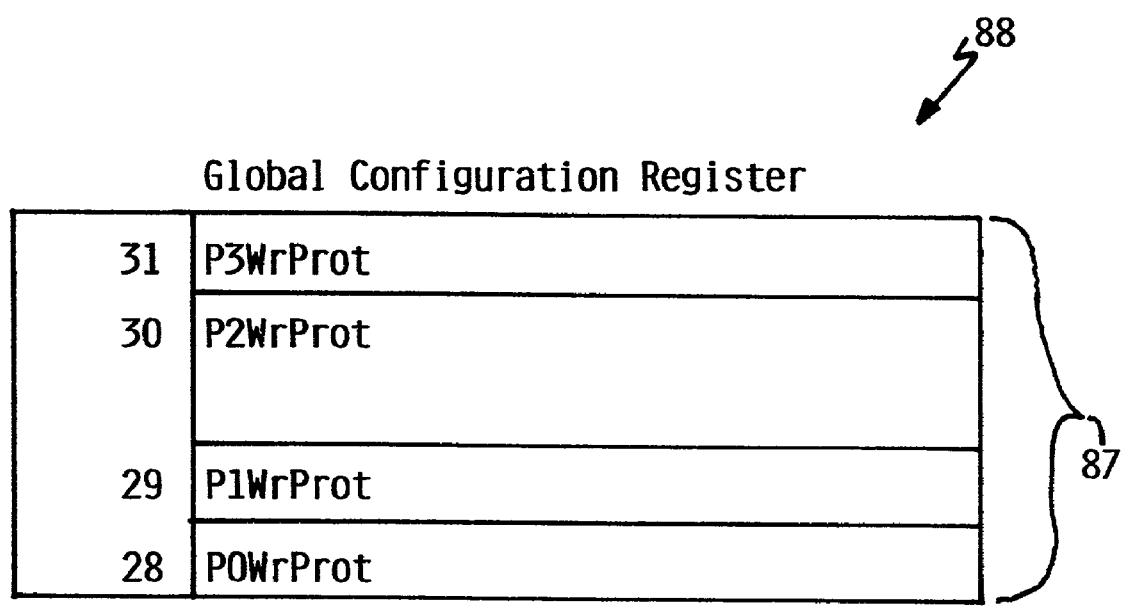
FIG. 15 is a diagram illustrating the partial contents of the global configuration register used in accordance with an embodiment of the present invention.

FIG. 15 illustrates part of the global configuration register used to configure system-wide parameters. FIG. 15 is truncated for clarity, as it illustrates only the definitions of bit numbers 28 through 31 inclusive shown as group 87 in FIG. 15. Each port of system 60 has its own individual P*WrPROT bit to which only that port can write. All ports of the system can read the entire register 88. All bits in this register other than those in the write protect bit group 87 are write protected if any of the ports have set their P*WrPROT bit. In register 88, the first port to write to the register and set its write protection bit establishes the configuration, thereafter, only changes can be made with the cooperation of all ports. In the hardware implementation of the preferred embodiment, the register can be read to determine which ports have their write protect bits set if it is desired to read the status of the write protect bits 87. It will be appreciated that since register 88 is illustrated in FIG. 15 as a truncated version of the entire register in that the register is comprised of 32 bits, the remaining bits of register 88 down to and including bit 0 have other functions in the system, not directly related to the partition write protection system described herein. It will be further appreciated that the P*WrPROT bits are functionally distinct and independent from the partition write protect bit P*PartWrProt bits 77 and the port write protect bits P*PortWrProt bit 78.

FIG. 14 illustrates port 0 partition configuration register 89. Register 89 is also a 32-bit register used to store information about each port's configuration relative to its partition assignment. As each physical port in the system has a partition configuration register equivalent to register 89 in FIG. 14, it can be appreciated that the description of register 89 also describes the other three configuration registers for ports 1, 2, and 3 in the embodiment disclosed. Each configuration register is located at a separate local control and status register (CSR) address. All the partition configuration registers for all four ports may be accessed from any port in the system. As described in FIG. 14, configuration register 89 is used to specify information about crossbar 70's physical port 0, shown on FIG. 7, and the partition to which port 0 belongs. Port 0's connections to crossbar 70 are shown at input 40 and output 45 in FIG. 7.

A partition write protect bit, P0PartWrProt 77, and a port write protect, P0PortWrProt 78, are used to restrict write access and protect partitions from non-member quads (via their ports) in the system. In the invention, a restriction is provided that a specified bit must be in a certain state in order to enable writing of another bit, and such state must exist before a write is successful in changing the state of that bit. In general, either write protect bit does not restrict writes by the port that owns the Partition Configuration register that is the target of the write (or the target port, in this case, port 0), except that P0PartWrProt 77 can only be written by a port that is member of the target port's committed partition.

P0PartWrProt 77 restricts writes of bits 91, 79, and 93 by non-owner ports, all under certain circumstances. P0PortWrProt 78 restricts writes of bits 91, 78, 79, 92, and 93 by non-owner ports, all under certain circumstances. Each bit or field that is protected by these two write protect bits does so under the following circumstances:

P0Enable 91 is protected from writes by non-owning ports when P0PortWrProt 78 is active, and is protected from writes by non-members of its committed partition when P0PartWrProt 77 is active.

P0PartWrProt 77 is protected from writes by ports that are non-members of the target port's committed partition.

P0PortWrProt 78 is protected from writes by any non-owner port if it is already active.

P0Commit 79 is protected from writes by any non-owner port if P0PortWrProt 78 is active, or writes by non-owner ports that have their port's PartWrProt active and have a different ParNum.

P0logID 92 is protected from writes by any non-owner port if P0PortWrProt 78 is active.

P0ParNum 93 is protected from writes by any non-owner port if P0PortWrProt 78 is active, or writes after it has been committed (by activating P0Commit 79) while any other port has its PartWrProt active and has the same ParNum as being written here (this blocks a committed port from simply changing its ParNum).

P0enable bit 91 is a bit that enables port 0 subject to certain conditions. If bit 91 is clear, port 0 in the system is disabled and will not respond to port 0 inbound transactions.

P0logID 92 is a two-bit field (3:2) that identifies the logical node ID of crossbar 70 physical port 0, being shown as the bus comprised of input 40 and output 45 in FIG. 7. Bit 92 is used in crossbar 70's input block to determine whether port 0 is the target of a transaction.

P0Commit bit 79 determines whether port 0 is to be part of the partition indicated by field 93, which is P0ParNum. When bit 79 is cleared, then port 0 is not considered to be part of any partition. It could be appreciated that if the P0Commit bit 79, or its equivalent in the partition configuration registers for other ports is not set, it is possible that a particular port will not be assigned to any partition in the system and therefore could be disabled if desired. Therefore, the invention allows selection of one or more nodes to operate within a given partition, while disabling one or more nodes to be dormant in a given configuration of the system.

Advantages over the Prior Art

Embodiments of the invention allow for advantages over the prior art. Embodiments are more fault tolerant than approaches for binding building blocks to partitions that employ a master building block, because the failure of any one building block does not prevent the others from properly binding to their respective partitions. Furthermore, although embodiments of the invention employ a masterless approach for binding building blocks to partitions, race conditions are avoided through the use of the various identifiers and indicators of the building blocks that have been described. The building blocks are also protected from other building blocks, as well as from rogue software. The partitions themselves are also protected.

Alternative Embodiments

It will be appreciated that, although specific embodiments of the invention have been described herein for purposes of illustration, various modifications may be made without departing from the spirit and scope of the invention. For instance, whereas the invention has been described as capable of being implemented on NUMA systems, it can also be implemented in conjunction with other types of multi-processor systems having fewer or more processor or I/O devices, or different arrangements and sizes of memory than the quads described herein, as well as to systems having fewer or more building blocks or nodes than the four quads described herein. Additionally, the process of partitioning the building blocks may use protect and commit indicators other than the bits and port identifiers described above. Accordingly, the scope of protection of this invention is limited only by the following claims and their equivalents.

We claim:

1. A method for masterless building block partitioning comprising:

communicating among a plurality of building blocks to determine a partition to which each of the plurality of building blocks is to be partitioned;

for each unique partition to which one or more of the plurality of building blocks is to be partitioned, communicating among the one or more of the plurality of building blocks to determine building block uniqueness of the unique partition; and, joining the unique partition by each of the one or more of the plurality of building blocks, wherein communicating among the plurality of building blocks comprises at least one of:

sending from each building block of the plurality to all other building blocks of the plurality a partition identifier identifying the partition to which the building block is to be partitioned; and, sending from each building block of the plurality to all other building blocks of the plurality a logical port identifier identifying the building block in the unique partition.

2. The method of claim 1, wherein communicating among the plurality of building blocks comprises receiving by each building block of the plurality from all other building blocks of the plurality partition identifiers identifying the partitions to which all the other building blocks are to be partitioned.

3. The method of claim 1, wherein communicating among the plurality of building blocks comprises sending from each building block of the plurality to all other building blocks of the plurality a physical port identifier identifying the building block.

4. The method of claim 3, wherein communicating among the plurality of building blocks further comprises receiving by each building block of the plurality from all other building blocks of the plurality physical port identifiers identifying all the other building blocks.

5. The method of claim 1, wherein communicating among the plurality of building blocks further comprises receiving by each building block of the one or more of the plurality from all other building blocks of the one or more of the plurality logical port identifiers identifying all the other building blocks in the unique partition.

6. The method of claim 1, wherein communicating among the one or more of the plurality of building blocks comprises determining by each building block of the one or more of the plurality whether the unique partition has been protected by any building block of the one or more of the plurality.

7. The method of claim 6, wherein determining whether the unique partition has been protected comprises examining partition protect indicators and commit indicators of the one or more of the plurality of building blocks.

8. The method of claim 1, wherein communicating among the one or more of the plurality of building blocks comprises committing by each building block of the one or more of the plurality to the unique partition.

9. The method of claim 8, wherein committing to the unique partition comprises setting a commit indicator.

10. The method of claim 1, wherein joining the unique partition by each of the one or more of the plurality of building blocks comprises protecting the unique partition.

11. The method of claim 10, wherein protecting the unique partition comprises setting a partition protect indicator and a commit indicator.

12. The method of claim 10, wherein joining the unique partition by each of the one or more of the plurality of building blocks further comprises each building block protecting itself.

13. The method of claim 12, wherein each building block protecting itself comprises setting a building block protect indicator.

14. The method of claim 1, further comprising removing a building block from a partition.

15. The method of claim 14, wherein removing a building block from a partition comprises turning off a commit indicator of the building block.

16. A system comprising:
a commit indicator for each of the plurality of building blocks to be partitioned, the commit indicator of a building block signifying that the building block has joined a partition; and,
a partition protect indicator for each of the plurality of building blocks, the partition protect indicator of a building block signifying that a partition that the building block has joined is protected and that only other of the plurality of building blocks that have joined the partitioned building block may change the commit indicator of the building block.

17. The system of claim 16, further comprising a building block protect indicator for each of the plurality of building blocks, the building block protect indicator of a building block signifying that the partition identifier of the building block can only be changed by the building block itself.

18. The system of claim 17, wherein the building block protect indicator further signifies that a logical identifier of the building block can only be changed by the building block itself.

19. The system of claim 17, wherein the building block protect indicator further signifies that a physical identifier of the building block can only be changed by the building block itself.

20. The system of claim 17, wherein the building block protect indicator comprises a hardware bit that can he set to zero or one.

21. The system of claim 16, wherein the commit indicator signifies that a logical identifier and a partition identifier of the building block cannot be changed.

22. The system of claim 21, wherein the logical identifier is a logical port identifier.

23. The system of claim 21, wherein the commit indicator comprises a hardware bit that can be set to zero or one.

24. The system of claim 16, wherein the partition protect indicator of the building block being set in addition to the commit indicator of the building block being set signifies that a partition that the building block has joined is protected.

25. The system of claim 16, wherein the partition protect indicator comprises a hardware bit that can be set to zero or one.

26. An article comprising:
a computer-readable medium; and,
means in the medium for joining a partition in a masterless manner by a building block of a plurality of building blocks, by communicating with other building blocks of the plurality of building blocks and by examining a plurality of indicators of each of the other building blocks, including a partition protect indicator, a building block protect indicator, and a building-block-to-partition commit indicator, the partition protect indicator signifying that only other of the plurality of building blocks that have joined the partition of the building block may change the building-block-to-partition commit indicator of the building block.

27. The article of claim 14, wherein the medium is selected from the group consisting of: a modulated carrier signal; and a recordable data storage medium.

* * * * *